(12) United States Patent
Watanabe et al.

(10) Patent No.: US 6,413,486 B2
(45) Date of Patent: Jul. 2, 2002

(54) NONAQUEOUS SECONDARY BATTERY, CONSTITUENT ELEMENTS OF BATTERY, AND MATERIALS THEREOF

(75) Inventors: Kazuhiro Watanabe, Kanagawa; Katsuhiro Nichogi, Tokyo; Norishige Nanai, Kanagawa; Akihito Miyamoto, Kanagawa; Soji Tsuchiya, Kanagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/327,070

(22) Filed: Jun. 7, 1999

(30) Foreign Application Priority Data

| Jun. 5, 1998 | (JP) | ......... | 10-157271 |
| Jun. 11, 1998 | (JP) | ......... | 10-163134 |
| Jan. 26, 1999 | (JP) | ......... | 11-016754 |
| Feb. 26, 1999 | (JP) | ......... | 11-050038 |
| Apr. 21, 1999 | (JP) | ......... | 11-113283 |

(51) Int. Cl.$^7$ ............................................. C01B 31/02
(52) U.S. Cl. ................................................. 423/445 R
(58) Field of Search ...................... 423/445 R; 264/29.1, 264/29.7

(56) References Cited

U.S. PATENT DOCUMENTS

| 5,232,772 A | * | 8/1993 | Kang ..................... 423/445 R |
| 5,578,255 A | * | 11/1996 | Okuyama et al. .......... 264/29.5 |

FOREIGN PATENT DOCUMENTS

| JP | 60-225376 | 11/1985 |
| JP | 61-68868 | 4/1986 |
| JP | 62-90863 | 4/1987 |
| JP | 63-121260 | 5/1988 |
| JP | 3-34270 | 2/1991 |
| JP | 3-49155 | 3/1991 |
| JP | 3-225775 | 10/1991 |
| JP | 06005277 | 1/1994 |
| JP | 07065862 | 3/1995 |
| JP | 08213049 | 8/1996 |

OTHER PUBLICATIONS

Kage, J.L. "The Role of Microporosity in the High–Temperature Structural Stability of Glassy Carbon" in *Carbon* vol. 23 #1 1985, pp. 39–43.*

* cited by examiner

Primary Examiner—Stuart L. Hendrickson
(74) Attorney, Agent, or Firm—Ratner & Prestia

(57) ABSTRACT

To realize constituent elements for realizing a nonaqueous secondary battery having high energy density and high repeating stability, and a nonaqueous secondary battery using the same.

To present also a lithium ion secondary battery of light weight and high energy density to be used in various electronic appliances and power source of electric vehicle or the like.

By using vanadium oxide expressed as $M_{2+x}V_4O_{11}$, where x is 0 or more to 1 or less, and M is a monovalent metal ion such as Cu and Li, as positive electrode, a nonaqueous secondary battery having high energy density and high repeating stability is obtained. Moreover, by using the carbon obtained by heating a cured resin by adding an aromatic compound of 2 to 10 rings to a high polymer before curing, as negative electrode, a nonaqueous secondary battery of high energy density is obtained. By composing an electrochemical element by using a gel or solid ion conductor having an iron containing an organic cationic structure including quaternary nitrogen or its derivative and different cations at least as coexistent ions, a nonaqueous secondary battery of high energy density is obtained.

As the current collector of the battery, by using a graphite sheet obtained by baking a high polymer film, a lithium ion secondary battery of light weight, excellent cycle characteristics and high energy density is presented.

4 Claims, 11 Drawing Sheets

Fig. 1

| | Example 1 | Example 3 |
|---|---|---|
| 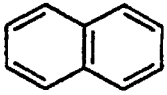 | Discharge capacity 450mAh/g<br>Irreversible capacity 140mAh/g | Discharge capacity 488mAh/g<br>Irreversible capacity 130mAh/g |
| 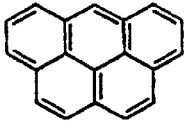 | Discharge capacity 450mAh/g<br>Irreversible capacity 135mAh/g | Discharge capacity 493mAh/g<br>Irreversible capacity 103mAh/g |
| 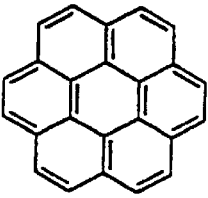 | Discharge capacity 447mAh/g<br>Irreversible capacity 130mAh/g | Discharge capacity 441mAh/g<br>Irreversible capacity 98mAh/g |
| 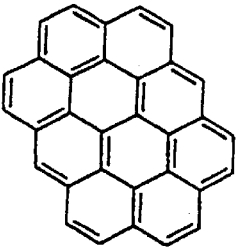 | Discharge capacity 440mAh/g<br>Irreversible capacity 120mAh/g | Discharge capacity 446mAh/g<br>Irreversible capacity 80mAh/g |
| 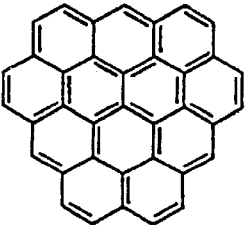 | Discharge capacity 380mAh/g<br>Irreversible capacity 70mAh/g | Discharge capacity 346mAh/g<br>Irreversible capacity 80mAh/g |

Fig. 2

| | Example 2 | Example 4 |
|---|---|---|
| 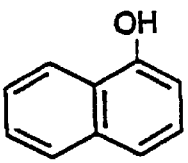 | Discharge capacity 470mAh/g<br>Irreversible capacity 140mAh/g | Discharge capacity 520mAh/g<br>Irreversible capacity 130mAh/g |
| 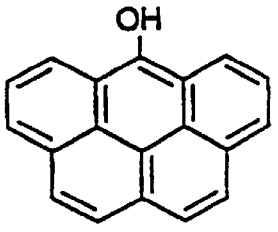 | Discharge capacity 450mAh/g<br>Irreversible capacity 135mAh/g | Discharge capacity 520mAh/g<br>Irreversible capacity 130mAh/g |
| 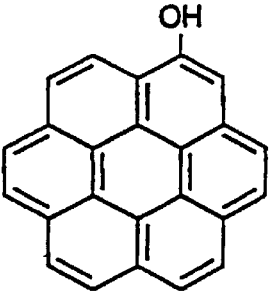 | Discharge capacity 440mAh/g<br>Irreversible capacity 130mAh/g | Discharge capacity 492mAh/g<br>Irreversible capacity 105mAh/g |
| 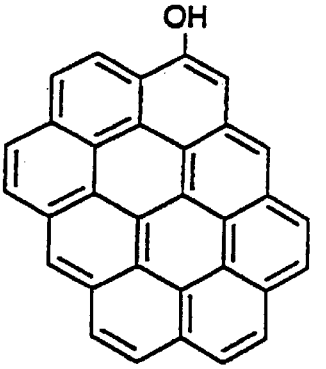 | Discharge capacity 440mAh/g<br>Irreversible capacity 120mAh/g | Discharge capacity 485mAh/g<br>Irreversible capacity 95mAh/g |

NONAQUEOUS SECONDARY BATTERY, CONSTITUENT ELEMENTS OF BATTERY, AND MATERIALS THEREOF

BACKGROUND OF THE INVENTION

1. Field of the Invention

The present invention relates to a nonaqueous secondary battery of high energy density and high repeating stability usable as power source for electronic appliance, constituent elements of battery, and electrochemical elements.

The invention further relates to a novel secondary battery of large size, small size, thin type, and light weight usable in the fields of electronic appliance, electric vehicles and others, and more particularly to a lithium ion secondary battery of high energy density of which current collector is composed of a flexible graphite sheet.

2. Description of the Prior Art

Along with the enhancement of performance of electronic appliances, the appliances are required to be smaller in size and portable. As a result, secondary batteries of small size and large capacity are demanded. On the other hand, for use as power source for electric vehicle, secondary batteries of large size, light weight, and large capacity are demanded.

Existing secondary batteries include the lead storage battery and nickel-cadmium battery, among others, but to replace them, lithium secondary batteries of higher energy density are attracting wide attention. In lithium secondary batteries, it was first attempted to use metal lithium as active material, but as charging and discharging were repeated, dendritic metals grow on the electrode surface, and if the growth is excessive, it is known to lead to overheating of the battery.

As one of the methods to prevent this, it has been proposed to use a carbonaceous material for absorbing lithium between layers, instead of metal lithium. When a carbonaceous material is used, lithium dendrite does not grow, and it is effective to prevent overheating of the battery.

However, when graphite is used as carbonaceous material, the upper limit of the capacity is 372 mAh/g. Instead of graphite, by using a material obtained by baking pitch at low temperature of 1000° C. or less, it is known that a capacity exceeding 372 mAh/g is obtained.

In this low temperature baking of pitch, however, the potential in charging and discharging fluctuates largely depending on the depth of charging and discharging, and it is hard to handle in control of power source.

This capacity is the electric charge density, and for increase of capacity from the viewpoint of energy density, it is disadvantageous when the flat zone of potential is small.

As other method of suppressing growth of lithium dendrite, it is proposed to solidify or gelate the electrolyte solution between positive and negative electrodes. In the conventional battery, liquid electrolyte was used, and dendrites grew, but by solidifying or gelating, it has been known that the dendrite growth is notably suppressed in the direction of the solid electrolyte.

Moreover, by solidifying or gelating, if metal lithium can be used as active material, the lithium performing oxidation and reduction reaction can be directly used as the electrode, and the upper limit of the capacity restricted when using carbon can be increased, and a large capacity is realized.

In the conventional battery, to prevent leak of electrolyte solution, a rigid container and a seal structure were used, which was hindrance to reduction of weight and thickness.

Yet, to seal a container in a shape having notch or the like, an expensive and complicated device was needed. By solidifying or gelating the electrolyte, a simple container or seal structure can be used as compared with the case of using liquid, and the battery can be reduced in thickness and formed in a desired shape. More preferably, flash point and other heat resistant stability tend to be higher than in liquid, and it is expected to be beneficial in the assembling and manufacturing process.

Not only larger capacity, but also longer life of secondary battery is also demanded. In most secondary batteries containing lithium ions in the electrolyte, transition metal oxides such as $LiCoO_2$, $LiMn_2O_4$, and $V_2O_5$ are used in the positive electrode, but these transition metal oxides change in the volume significantly depending on lithium ions moving in and out. Accordingly, as the battery repeats charging and discharging, the performance as secondary battery deteriorates, and finally failing to charge and discharge sufficiently.

In the condenser, on the other hand, liquid electrolyte was used in the inexpensive electrolytic type, but evaporation of electrolyte was one of the factors of aging deterioration of characteristics. To prevent such aging deterioration, instead of liquid electrolyte, it has been attempted to use manganese dioxide or conductive high polymer. Alternatively, by gelating the electrolyte, evaporation may be suppressed. In the case of the gel, a stronger restoration action of the condenser is expected, as compared with solid electrolyte such as manganese dioxide.

In conventional lithium secondary batteries, as disclosed in Japanese Laid-open Patent No. 62-90863, Japanese Laid-open Patent No. 63-121260, and Japanese Laid-open Patent No. 3-49155, a transition metal compound oxide mainly composed of lithium and cobalt is used in the positive active material, and a carbon material in the negative active material. The positive active material is disposed on a metal current collector of aluminum, stainless steel or the like, and the negative active material on a metal current collector made of copper foil of 10 to 20 $\mu$m in thickness that is, an aqueous binder or nonaqueous binder is added to the active material, and is applied and held on one side or both sides of the current collector.

Thus, in the conventional lithium secondary battery, since a metal of large specific gravity is used in the current collector, the energy density per unit weight of the battery is not so high. Besides, such current collector is poor in contact with the active material, and the contact resistance increases, which causes impedance increase and cycle deterioration.

Recently, on the other hand, from the standpoint of environmental problems such as air pollution and global warming, large-sized secondary batteries of large capacity as power source for electric vehicles are being developed intensively. As the power source for electric vehicle, nickel-hydrogen absorbing alloy battery, lead storage battery, and nickel-cadmium battery are being put in practical use.

However, the total weight of the battery is very heavy, about 300 to 500 kg, and the energy density per unit weight is small, and the driving distance per one charge is limited, and development of secondary battery of high energy density per unit weight is urgently needed.

As the nonaqueous secondary battery used in the power source for electronic appliance, a larger capacity for longer time of continuous use, smaller size, and lighter weight is demanded. At the same time, high repeating stability for longer life is required. To satisfy these requirements, the nonaqueous secondary battery of high energy density and high repeating stability is demanded. However, to realize the nonaqueous secondary battery or electrochemical elements satisfying both high energy density and high repeating stability, there were problems as mentioned in the prior art.

The invention is to solve these problems, and it is hence an object thereof to realize constituent elements for manufacturing the nonaqueous secondary battery having high energy density and high repeating stability, and nonaqueous secondary battery and electrochemical elements using them.

It is also an object of the invention to present a lithium ion secondary battery of large capacity, excellent in cycle characteristics by improving the current collector to reduce the battery weight.

SUMMARY OF THE INVENTION

It is an object of the invention to realize constituent elements for manufacturing a nonaqueous secondary battery having high energy density and high repeating stability, and a nonaqueous secondary battery and electrochemical elements using them.

It is also an object of the invention to present a lithium ion secondary battery of large capacity, excellent in cycle characteristics by improving the current collector to reduce the battery weight.

To solve the problems, the invention relates to a nonaqueous secondary battery having a positive electrode and a negative electrode for absorbing and releasing lithium ions, using an ion conductor containing lithium ions as electrolyte, in which at least one of the positive electrode and negative electrode is made of an active material of which crystal lattice structure and row structure of lithium ions inserted therein are in mismatched relation, and therefore a nonaqueous secondary battery having high energy density and high repeating stability is realized.

In the invention, to solve the problems, the active material is composed of an oxide containing vanadium, and by using it, a nonaqueous secondary battery having high energy density and high repeating stability is realized.

Further, as a result of intensive studies to solve the problems, it is discovered that the porous structure of carbon has a serious effect on absorption of lithium, which has finally led to the present invention. That is, the invention presents the carbon material having the following features and its manufacturing method.

(1) An aromatic compound of 2 to 10 rings is added to the high polymer before curing, and the cured resin is heated.

(2) An aromatic compound of 2 to 10 rings is added to the high polymer before curing, and the cured resin is heated after reaction of aromatic compound and high polymer.

(3) In the cured resin, heat treatment consists of at least two steps.

To solve the problems, further, in the invention, a gel or solid comprising an ion or its derivative including an organic cationic structure containing quaternary nitrogen expressed in formulas (I) to (VI), and different cations at least as coexistent ions is used as an ion conductor, and by composing an electrochemical element by using it, a nonaqueous secondary battery of high energy density or electrochemical element is realized.

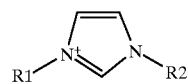

(R1 and R2 are groups having an aliphatic carbon directly bonded to a nitrogen atom.)

(I)

(R3 is an aromatic group, and R4, R5, R6 are groups having an aliphatic carbon directly bonded to a nitrogen atom.)

(II)

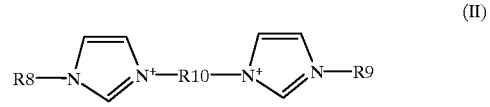

(R8 and R9 are groups having an aliphatic carbon directly bonded to a nitrogen atom, and R10 is a group containing at least aliphatic carbon.)

(III)

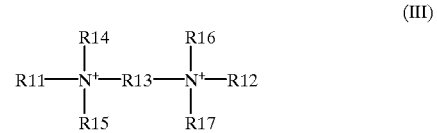

(R14, R15, R16 and R17 are groups having an aliphatic carbon directly bonded to a nitrogen atom, and at least one of R11, R12 and R13 is an aromatic group, and non-aromatic groups are groups containing carbon)

(IV)

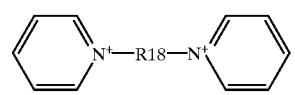

(R18 is a group containing at least aliphatic carbon.)

(V)

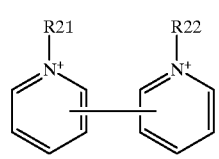

(R21 and R22 are groups having an aliphatic carbon directly bonded to a nitrogen atom.)

(VI)

It is a feature of the lithium secondary battery of the invention that its current collector is composed of a specific graphite sheet. More specifically, it is manufactured by baking high polymer film, and a flexible graphite sheet capable of folding at radius of curvature of 1 mm or less and angle of 160 degrees or more is used as the current collector.

As a result, as compared with the conventional battery using the metal current collector of large specific gravity, the battery of the invention is reduced in weight, and the contact with the active material is improved, so that the lithium ion secondary battery having excellent cycle characteristic and high energy density can be presented.

The invention provides a carbon material prepared by adding an aromatic compound of 2 to 10 rings to a high polymer before curing, and heating the cured resin. The cured resin produces fine crystals of carbon called crystallites at the time of carbonization taking place after pyrolysis from 300° C. to about 600° C. Crystallites occurring in such process produce many defects inside, and large gaps (pores) are formed between adjacent crystallites.

On the other hand, in the cured resin dispersing an aromatic compound of 2 to 10 rings, crystallites are more likely to be generated. Besides, since the aromatic compound has a flatness, defects inside the crystallites decrease, and gaps (pores) between adjacent crystallites are narrower, and pores (<10 Å) in the size contributing to lithium absorption are formed.

As the high polymer before curing, various commercial high polymers may be used, and in particular, preferably, phenol resin, polyamide acid, and furfuryl alcohol resin are used. These high polymers produce isotropic carbons by heat treatment so as to facilitate formation of pores.

Of these high polymers, in particular, by using a phenol resin using methyl phenol or dimethyl phenol as the base, fine pores are formed more easily.

On the other hand, as the additive, the aromatic compound is not preferred to be linear if having 3 or more rings. If linear, the flatness of crystallites formed after carbonization becomes poorer than in non-linear composition, and the formed pores are larger than the size for absorbing lithium.

As a method of controlling the structure of crystallites, it is preferred that the cured resin is pulverized beforehand. If pulverized after carbonization, mechanical force is applied to the carbon structure, and the formed pore structure may be disturbed.

Heat treatment of the cured resin for controlling the structure of crystallites is preferred to be done in inert atmosphere or in vacuum. In the case of inert atmosphere, the concentration of the substance for giving activation effect to carbon, for example, oxygen or carbon dioxide, must be 100 ppm or less. If such substances are contained by more than 100 ppm, the carbon receives activation from the surface, and the pores as reaction sites of lithium are destroyed.

The heat treatment temperature of the cured resin is 800° C. or more and 1400° C. or less, and preferably 900° C. or more and 1200° C. or less. If less than 800° C., although the capacity is large, the discharge curve has a plateau at +0.8 V for the equilibrium potential of lithium. In such discharge curve, the potential of the battery cannot be heightened, and it is not preferred. At heat treatment over 1400° C., crystallites are grown, pores are destroyed, and the discharge capacity is lowered.

Further, to raise the capacity, an aromatic compound of 2 to 10 rings is added to the high polymer before curing, and the cured resin is heated after reaction of aromatic compound and high polymer. As the high polymer before curing, any polymer inducing crosslinking reaction may be used, and phenol resin, polyamide acid, and furfuryl alcohol resin are preferably used.

For the ease of crosslinking reaction between the high polymer and aromatic compound, it is preferred that the aromatic compound may contain at least one phenolic hydroxyl group. As a result, the electron state of the aromatic high polymer is varied, and the adjacent portion of the phenolic hydroxyl group becomes active.

The aromatic compound used at this time is not preferred to be linear if having 3 or more rings. If the aromatic compound is linear, the flatness of crystallites formed after carbonization becomes poorer than in branched composition, and the formed pores are larger than the size for absorbing lithium.

The cured resin thus obtained is usually solid, and it may be used directly, but is preferred to be used as powder.

Such cured resin is heated in inert atmosphere or vacuum at 800° C. or more to 1400° C. or less. By dividing this heat treatment process in at least two steps, the characteristics may be further enhanced.

The first step of heat treatment is a process necessary for removing the gas generated at the time of heat treatment sufficiently at low temperature. The gas generated at the time of heat treatment gives activation effect to the carbon, and multiple functional groups containing oxygen are formed on the carbon surface.

Such carbon increases the irreversible capacity which is the difference between the initial charge capacity and the initial discharge capacity, and it is inappropriate as negative electrode material. This heat treatment temperature must be 700° C. or less. After this heat treatment process, heat treatment at 800° C. or more to 1400° C. or less may be done either consecutively or after once cooling.

Incidentally, the heat treatment at 700° C. or less may be followed by pulverization. After this heat treatment, since the cured resin is promoted in carbonization, pulverization may be done efficiently.

It is a feature of the invention to heat the cured resin. For this heat treatment, usually, an annular furnace may be used, but it is preferred to use an inducting heating furnace. In the annular furnace, the heat invades inside through the surface, first the surface is carbonized, and the carbonization gradually advances inside.

As a result, the surface comes to have a structure less likely to allow gas transmission, and the gas generated by pyrolysis in the inside is not removed smoothly, and the degree of carbonization differs between the surface and the inside. Accordingly, the action as the electrode mainly takes place on the surface, and the action of the inside of the carbon as the electrode is small, and it is not desired. To avoid this, the entire structure must be uniformly carbonized.

It is realized by using an induction heating furnace for heat treatment of the cured resin.

Thus obtained carbon material may be used as the negative electrode material of nonaqueous electrolyte secondary battery.

The invention relates to an electrochemical element comprising a gel or solid ion conductor using an ion or its derivative including a structure shown in formula (I), and different cations at least as coexistent ions and by using it, the capacity of the nonaqueous secondary battery can be increased by using, for example, a metal lithium electrode.

The invention also relates to an electrochemical element comprising a gel or solid ion conductor using an ion or its derivative including a structure shown in formula (II), and different cations at least as coexistent ions and by using it, the capacity of the nonaqueous secondary battery can be increased by using, for example, a metal lithium electrode.

The invention further relates to a gel or solid ion conductor comprising an ion or its derivative including a structure shown in formula (III), and different cations at least as coexistent ions, and by using it, the capacity of the nonaqueous secondary battery can be increased by using, for example, a metal lithium electrode.

The invention further relates to a gel or solid ion conductor comprising an ion or its derivative including a structure shown in formula (IV), and different cations at least as coexistent ions, and by using it, the capacity of the nonaqueous secondary battery can be increased by using, for example, a metal lithium electrode.

The invention further relates to a gel or solid ion conductor comprising an ion or its derivative including a structure shown in formula (V), and different cations at least as coexistent ions, and by using it, the capacity of the nonaqueous secondary battery can be increased by using, for example, a metal lithium electrode.

The invention further relates to a gel or solid ion conductor comprising an ion or its derivative including a structure shown in formula (VI), and different cations at least as coexistent ions, and by using it, the capacity of the nonaqueous secondary battery can be increased by using, for example, a metal lithium electrode.

In the invention, the number of carbon atoms of R10 in (III), the number of carbon atoms of R13 in (IV), and the number of carbon atoms of R18 in (V) are 1 or more to 16 or less, and the ion conductor is characterized by containing at least one of alkyl group, aromatic group, group containing ether bond, group containing carbonyl group, nitrile cyano group, and alcohol hydroxyl group, and by using it, the capacity of the nonaqueous secondary battery can be increased by using, for example, metal lithium electrode.

The invention relates to a gel or solid ion conductor comprising an ion having two or more structures selected from (I) to (VI) or structures derived therefrom within same ions, and different cations at least as coexistent ions, and by using it, the capacity of the nonaqueous secondary battery can be increased by using, for example, metal lithium electrode.

The invention further relates to an ion conductor of which coexistent cations contain at least metal ions, and by using it, the capacity of the nonaqueous secondary battery can be increased by using, for example, metal lithium electrode.

The invention further relates to an ion conductor of which metal ions contain at least one selected from alkaline metal, alkaline earth metal, silver ion, copper ion, and zinc ion, and by using it, the capacity of the nonaqueous secondary battery can be increased by using, for example, metal lithium electrode.

The invention further relates to an ion conductor of which coexistent cations contain at least straight chain alkyl quaternary ammonium ions, and by using it, the capacity of the nonaqueous secondary battery can be increased by using, for example, metal lithium electrode.

The invention further relates to an ion conductor of which straight chain alkyl group in each one of quaternary ammonium ions has 1 to 4 carbon atoms, and by using it, the capacity of the nonaqueous secondary battery can be increased by using, for example, metal lithium electrode.

The invention further relates to an electrochemical element of which coexistent cations contain at least metal ions, and by using it, the capacity of the nonaqueous secondary battery can be increased by using, for example, metal lithium electrode.

The invention further relates to an electrochemical element of which metal ions contain at least one selected from alkaline metal, alkaline earth metal, silver ion, copper ion, and zinc ion, and by using it, the capacity of the nonaqueous secondary battery can be increased by using, for example, metal lithium electrode.

The invention further relates to an electrochemical element of which coexistent cations contain at least straight chain alkyl quaternary ammonium ions, and by using it, the capacity of the nonaqueous secondary battery can be increased by using, for example, metal lithium electrode.

The invention further relates to an electrochemical element of which each one of straight chain alkyl groups in quaternary ammonium ions has 1 to 4 carbon atoms, and by using it, the capacity of the nonaqueous secondary battery can be increased by using, for example, metal lithium electrode.

Moreover, the invention relates to an electrochemical element characterized by using an ion conductor, and by using it, the capacity of the nonaqueous secondary battery can be increased by using, for example, metal lithium electrode.

The invention also relates to an electrochemical element capable of storing or supplying electric energy, and by using it, the capacity of the nonaqueous secondary battery can be increased by using, for example, metal lithium electrode.

The invention also relates to an electrochemical element capable of storing or supplying electric energy by oxidation and reduction reaction, and by using it, the capacity of the nonaqueous secondary battery can be increased by using, for example, metal lithium electrode.

In the foregoing aspects, the nonaqueous secondary battery is presented as an example, but the invention not specified as the nonaqueous secondary battery in the claims is not limited to the nonaqueous secondary battery alone, but may be applied to condenser and other electrochemical elements.

The invention uses an ion conductor of gel or solid form, and as far as the ion conduction function is utilized for operating the electrochemical element, the element is not necessarily required to store or supply the electric energy.

The invention presents a nonaqueous secondary battery having a positive electrode and a negative electrode for absorbing and releasing lithium ions, and using an ion conductor containing lithium ions as electrolyte, and more specifically a nonaqueous secondary battery using a positive electrode and a negative electrode in which the structure of the crystal lattice and the array of lithium ions to be absorbed are in a mismatched relation when absorbing and releasing lithium ions, and as compared with the conventional positive active material, the discharge capacity is large, and the flat area of potential is very wide. In the embodiment, the nonaqueous secondary battery is shown as an example, but the invention not specified as the nonaqueous secondary battery in the claims is not limited to the nonaqueous secondary battery alone, but may be applied to condenser and other electrochemical elements. That is, the invention relates to an electrochemical element comprising a gel or solid ion conductor containing a nonionic high polymer, an ion or its derivative including a structure shown in (I), and different cations at least as a coexistent ion, and by using it, a higher energy density of electrochemical element is realized.

The invention relates to an electrochemical element of which ion conductor is gel at room temperature, and by using it, a higher energy density of electrochemical element is realized.

The invention also relates to an electrochemical element of which coexistent cations contain at least a metal ion, and by using it, a higher energy density of electrochemical element is realized.

The invention further relates to an electrochemical element of which metal ions contain at least lithium ions in particular, and by using it, a higher energy density of electrochemical element is realized.

The invention further relates to an electrochemical element of which coexistent cations contain at least quaternary ammonium ions, and by using it, a higher energy density of electrochemical element is realized.

The invention further relates to an electrochemical element of which quaternary ammonium ions contain at least straight chain alkyl quaternary ammonium ions, and by using it, a higher energy density of electrochemical element is realized.

The invention provides a nonaqueous secondary battery having an electrode for absorbing and releasing lithium ions, and by using it, a higher energy density of electrochemical element is realized.

The invention presents a lithium ion secondary battery characterized by using a flexible graphite sheet as a current collector, and as compared with the conventional metal collector of copper or nickel, the weight is lighter, and the battery weight can be reduced by using the current collector of the invention, so that the energy density per unit weight of the battery is enhanced. Moreover, since the current collector of the invention is flexible, the shape of the battery is not limited to square or cylindrical type alone, but it is applicable to batteries of various shapes such as sheet, square, cylindrical and other types.

By using the current collector of the invention in the large-sized power source for electric vehicle or the like, its weight is reduced, and the energy density per unit weight is increased, and the driving distance by one charge is notably extended.

Moreover, since the contact between the active material and the current collector of the invention is excellent, preventing decrease of electric capacity due to drop of contact between the current collector and active material due to charging and discharging cycles, a lithium ion secondary battery excellent in cycle characteristics can be presented.

The invention presents a lithium ion secondary battery of which graphite sheet is manufactured by baking an aromatic polyimide film of film thickness of 300 $\mu$m or less in an inert gas at maximum temperature of 2500° C. or more, and the graphite sheet of high quality and excellent flexibility is manufactured, and by using it as the current collector, the lithium ion secondary battery of light weight and large energy density per unit weight is presented.

In the lithium ion secondary battery of the invention, the electric conductivity of the graphite sheet is in a range of 2500 S/cm or more to 5500 S/cm or less, so that a lithium ion secondary battery of light weight, excellent cycle characteristics, and large capacity is presented.

In the lithium ion secondary battery of the invention, the graphite sheet density is in a range of 0.4 g/cc to 1.5 g/cc, so that a lithium ion secondary battery of light weight, excellent cycle characteristics, and large capacity is presented.

In the lithium ion secondary battery of the invention, the structure of the graphite sheet is characterized by that the plane interval of (002) planes of the graphite is in a range of 0.3354 nm to 0.3375 nm. By using the graphite sheet having such structure as the current collector, the battery weight can be reduced, and the energy density per unit weight of the battery is increased. Moreover, since the current collector of the invention is flexible, the shape of the battery is not limited, and it is applied to batteries of various shapes including sheet, square, cylindrical and others.

By using the current collector of the invention in the large-sized power source for electric vehicle or the like, its weight is reduced, and the energy density per unit weight is increased, and the driving distance by one charge is notably extended.

Moreover, since the contact between the active material and the current collector of the invention is excellent, preventing decrease of electric capacity due to drop of contact between the current collector and active material due to charging and discharging cycles, a lithium ion secondary battery excellent in cycle characteristics can be presented.

The invention presents a lithium ion secondary battery in which either one of amorphous carbon and graphite or a mixture thereof is provided on the graphite sheet as negative active material, and therefore since the weight is lighter as compared with the metal current collector of copper or nickel used in the conventional current collector, the battery weight can be reduced by using the current collector of the invention, so that the energy density per unit weight of the battery can be increased.

The current collector of the invention has, aside from the current collecting function, a function of absorbing and releasing lithium, thereby having an action of presenting a lithium ion secondary battery of high energy density substantially increased in the amount of the active material. Similarly, by using the current collector of the invention in the large-sized power source for electric vehicle or the like, its weight is reduced, and the energy density per unit weight is increased, and the driving distance by one charge is notably extended.

Moreover, since the contact between the active material such as amorphous carbon or graphite carbon and the current collector of the invention is excellent, preventing decrease of charge and discharge capacity due to drop of contact between the current collector and active material due to charging and discharging cycles, a lithium ion secondary battery excellent in cycle characteristics can be presented. Moreover, since the current collector of the invention is flexible, the shape of the battery is not limited, and it is applied to batteries of various shapes including sheet, square, cylindrical and others.

In the lithium ion secondary battery of the invention, at least one side of the graphite sheet is preliminarily treated to be multiporous by physical or mechanical method, and then the negative active material is provided, so that, by such surface treatments, the current collector of the invention is improved in, aside from the current collecting function, the function as the negative active material for absorbing and releasing lithium by itself, as compared with untreated current collector.

Therefore, by providing the negative active material after surface treatment of the invention, a lithium ion secondary battery of light weight and large capacity is presented.

Moreover, in the lithium ion secondary battery of the invention, after multiporous treatment of at least one side of the graphite sheet preliminarily by laser irradiation, either amorphous carbon or graphite carbon, or a mixture thereof is provided as a negative active material, and therefore, by this surface treatment, the current collector of the invention is improved in, aside from the current collecting function, the function as the negative active material for absorbing and releasing lithium by itself, as compared with untreated current collector.

Hence, by providing the negative active material after surface treatment of the invention, a lithium ion secondary battery of light weight and large capacity is presented.

The invention further presents a lithium ion secondary battery characterized by using a composition of either amorphous carbon or graphite carbon, or their mixture disposed on the graphite sheet as negative active material, so that a lithium ion secondary battery of light weight, excellent cycle characteristics and large capacity can be presented.

The invention further presents a lithium ion secondary battery characterized by using as an active material layer, an amorphous carbon, which is synthesized on a graphite sheet by heat-treating phenol resin in a temperature range of 700° C. to 1500° C., so that a lithium ion secondary battery of light weight and large capacity can be presented.

The invention further presents a lithium ion secondary battery characterized by disposing spherical, acicular or scaly graphite or mixture thereof on a graphite sheet, so that a lithium ion secondary battery of light weight and large capacity can be presented.

Further, in the lithium ion secondary battery of the invention, more specifically, the carbon powder on the graphite sheet has a mean particle size of 15 $\mu$m or less, and the thickness of the carbon powder layer is in a range of 0.05 mm to 0.3 mm, and the bulk density is in a range of 0.7 g/cc to 1.5 g/cc, so that a lithium ion secondary battery of light weight and large capacity can be presented.

The invention also presents a lithium ion secondary battery characterized by disposing an active material in powder form on a graphite sheet by printing method from paste state, so that a lithium ion secondary battery of light weight and large capacity, excellent in productivity, can be presented.

The invention also presents a lithium ion secondary battery characterized by disposing one of lithium cobaltate, lithium nickelate and lithium manganate, or a mixture thereof on a graphite sheet as a positive active material, so that a lithium ion secondary battery of light weight and increased energy density per unit weight can be presented.

The invention also presents a lithium ion secondary battery characterized by utilizing one or both of compositions having a positive active material or negative active material disposed on a graphite sheet as the electrode of the secondary battery for automobile, and since the weight is lighter as compared with the metal current collector of copper or nickel used in the conventional current collector, by using the current collector of the invention, the battery weight can be reduced, the energy density per unit weight of the battery is increased, and when used in the large-sized power source for automobile, its weight is reduced, and the energy density per unit weight is increased, and the driving distance by one charge is notably extended.

In the battery of the invention, various materials used in the conventional lithium ion secondary battery can be used in combination, and are not particularly limited.

For example, as the negative active material of the battery of the invention, carbonaceous materials capable of absorbing and releasing lithium can be used. Such materials include graphite, baked and carbonized materials of high polymer compound (phenol resin, furan resin), glass carbons, carbon fibers, activated carbon and others.

The positive active material includes compounds containing lithium capable of charging and discharging. For example, it is expressed in a general formula $Li_xMO_y$ (M means transition metal element such as Co, Ni, Mn and Fe, x is $0 \leq x \leq 2$, and y is $1 \leq y \leq 5$), and specific examples include $LiCoO_2$, $LiNiO_2$, $LiMnO_2$, and $LiMn_2O_2$. It is also effective to use any one of $AV_4O_{11}$, $A_xV_{4-z}M_zO_{11}$, $A_xB_yV_{4-z}M_zO_{11}$ (A, B, and M are metal elements, and x, y and z are 0 or more to 4 or less), or their mixture.

As organic solvent of nonaqueous electrolyte solution, propylene carbonate, ethylene carbonate, 1,2-butylene carbonate, 1,2-dimethoxy ethane, γ-butyrolactone, tetrahydrofuran, 2-methyl tetrahydrofuran, dioxane, dimethyl carbonate, diethyl carbonate, methyl ethyl carbonate, and dipropyl carbonate may be used either alone or in a mixture of two or more kinds.

Examples of supporting electrolyte include $LiPF_6$, $LiClO_4$, $LiAsF_6$, $LiSbF_6$, $LiBF_4$, LiI, LiBr, LiCl, $LiSO_3CH_3$, $LiSO_3CF_3$, and others.

The nonaqueous electrolyte used in the battery of the invention is not limited to liquid, but may be in gel or solid form.

The thickness, shape, and aperture rate of the current collector of the invention may be optimized depending on the kind of the active materials of the positive electrode and negative electrode of the battery, kind of electrolyte solution or electrolyte, or purpose of use of battery.

Thus, according to the invention, for realizing the nonaqueous secondary battery of high energy density and high repeating stability, constituent elements and the nonaqueous secondary battery using the same are obtained.

Further, by using a gel or solid ion conductor containing a nonionic high polymer, an ion including the structure shown in (I) or its derivative, and different cations at least as coexistent ions, an electrochemical element is obtained, so that a higher energy density is realized.

Since the conventional metal current collector is not used in the invention, the battery weight can be reduced. Further, the current collector of the invention has a function of working as active material by itself, aside from the current collecting function, so that a higher capacity is obtained.

Thus, according to the secondary battery using the current collector of the invention, a novel secondary battery of light weight and high energy density is presented, and it is expected to be particularly effective in large-sized structure such as the power source for an electric vehicle.

Moreover, the contact between the active material and the current collector of the invention is excellent, and it prevents decrease of battery capacity due to drop of contact between the current collector and active material due to charging and discharging cycles, so that a battery excellent in cycle characteristics may be presented.

BRIEF DESCRIPTION OF THE DRAWINGS

FIG. 1 is a diagram showing battery characteristics by using aromatic compounds added in embodiment 1 and embodiment 3.

FIG. 2 is a diagram showing battery characteristics by using aromatic compounds added in embodiment 2 and embodiment 4.

DETAILED DESCRIPTION OF THE PREFERRED EMBODIMENTS

Figure 3:
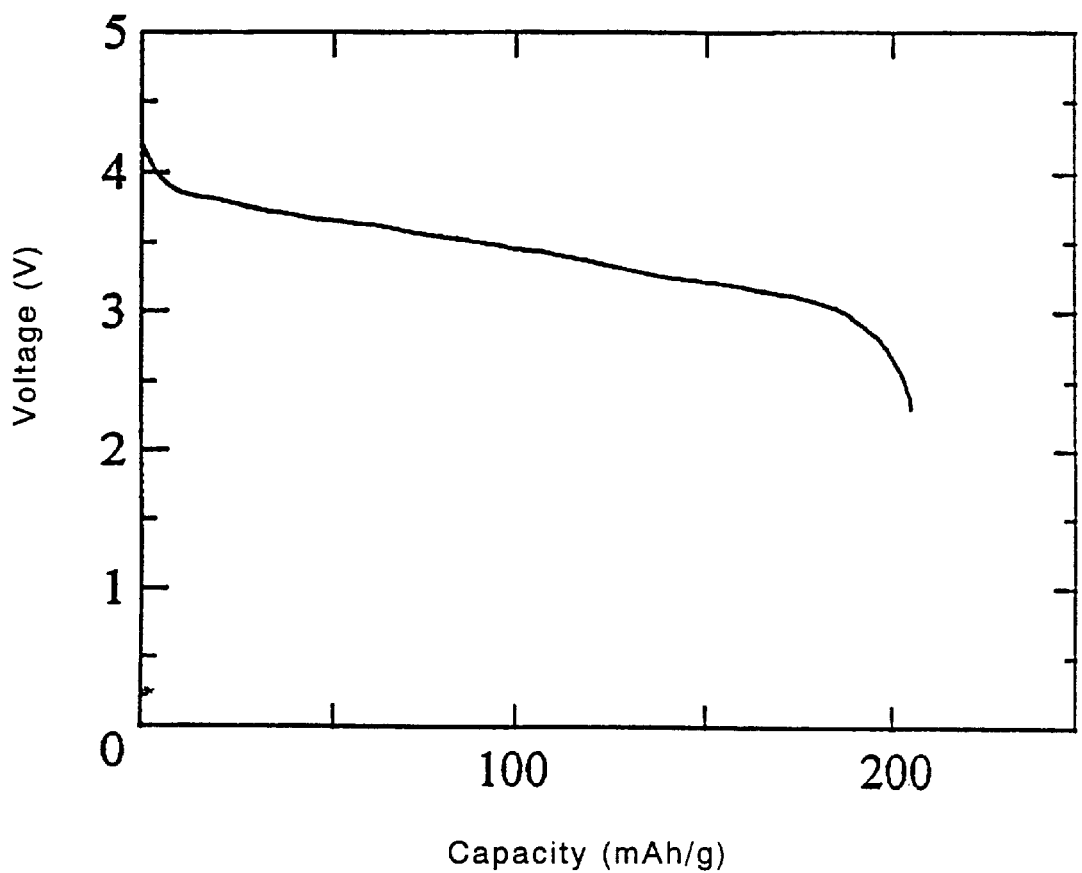
FIG. 3 is a diagram showing a charge-discharge curve of battery in embodiment 5.

Embodiments of the invention are described below. In the following description, the invention is explained on the basis of the results of experiment, but it must be noted that the invention is not limited to the illustrated embodiments alone, but may be modified properly within a scope not altering the purpose thereof.

In particular, in Examples 1 to 4, the carbon material of the invention to be used as the negative electrode is used as the positive electrode, and metal lithium is used as the negative electrode. That is, by using the metal lithium as the supply source of lithium ions, insertion and removal of lithium into and from the carbon material are simplified, and it is intended to prove the characteristic of the carbon material of the invention more clearly. It is evident for those skilled in the art that the constitution of the embodiments of the invention proves the utility as the negative electrode in the lithium ion battery which is the original purpose.

EXAMPLE 1

In this embodiment, using resol type phenol resin as high polymer before curing, powder of aromatic compounds with 2 rings, 5 rings, 7 rings, 10 rings and 12 rings was added by 10 parts by weight to 100 parts by weight, and heated to 180° C. while stirring, and by holding the same temperature for 2 hours, a cured resin was obtained. Thus obtained cured resin was crushed by hammer, and was pulverized by a planetary ball mill to a mean particle size of 10 μm.

Thus obtained powder was heated in nitrogen stream at 1000° C. for 1 hours at heating rate of 5° C./min. Mixing 3 g of obtained carbon powder into 3 g of binder having polyvinylidene fluoride dissolved in N-methyl pyrrolidone by 10 wt. %, it was applied on a copper foil of 20 μm in thickness, and dried, and an electrode plate was obtained. In an organic solvent mixing ethylene carbonate and diethyl carbonate at a ratio of 1:1, $LiPF_6$ was dissolved by 1 mol/liter, and an electrolyte solution was prepared.

Using a carbon electrode and metal lithium as counter electrode, porous polypropylene impregnated with the electrolyte solution was interposed between the two, they were put in a coin case of 2016 type, and a coin cell for evaluation was prepared by press sealing.

Thus obtained cells were charged at a constant current of 0.2 mA until the potential of 0 V, and charging was terminated after holding the 0 V potential for 20 hours. The cells were then discharged at a constant current of 0.2 mA until the potential of 1.5 V. As shown in FIG. 1, by addition of aromatic compounds of 2 rings to 10 rings, the discharge capacity and irreversible capacity presented sufficient practical characteristics as the negative electrode of the secondary battery.

EXAMPLE 2

An aromatic compound shown in FIG. 2 was mixed in the resol type phenol resin at the same rate as in Example 1, and held for 10 hours at 80° C. while stirring to react with the resol type phenol resin. From thus obtained cured resin, coil cells were manufactured in the same manner as in Example 1, and the battery characteristics were evaluated. As a result, as shown in FIG. 2, by reaction after addition of aromatic compounds of 2 rings to 10 rings, sufficient practical characteristics were presented as the negative electrode of the secondary battery.

EXAMPLE 3

The cured resin was obtained in the same manner as in Example 1. The cured resin was first heated to 600° C. in nitrogen at heating rate of 5° C./min, and this temperature was held for 1 hour. Once returning to room temperature, it was taken out, and pulverized by a planetary ball mill until a mean particle size of 10 μm. The time until completion of pulverization was 6 hours in Example 1, but it was 1 hour in the powder after heat treatment at 600° C.

The pulverized powder was heated again to 1000° C. in nitrogen at heating rate of 5° C./min, and held for 1 hour. From thus obtained powder, coin cells were prepared in the same manner as in Example 1, and the charge-discharge characteristics were measured. As a result, the irreversible capacity was lowered as compared with Example 1 as shown in FIG. 1.

EXAMPLE 4

Using the same materials as in Example 2, powder of cured resin was obtained in the same manner as in Example 1. This powder was heated in nitrogen atmosphere in an induction heating furnace to 1000° C. at heating rate of 5° C./min, and held at 1000° C. for 1 hour. From the obtained carbon powder, coin cells were prepared in the same manner as in Example 1, and charge-discharge characteristics were measured. As a result, the capacity was increased as compared with Example 2 as shown in FIG. 2.

EXAMPLE 5

This embodiment relates to an electrochemical element comprising a gel or solid ion conductor containing an ion including a structure shown in (I) or its derivative, and different cations at least as coexistent ions.

Dissolving 0.1 mol of 1-methyl imidazole and 0.13 mol of ethyl bromide in 50 ml of acetonitrile, the solution was poured into a container, and a cooler was attached thereto so as to recover the evaporation component, and heating reaction was conducted on a water bath for 4 hours at 80° C. The obtained reaction solution was decompressed and heated in a rotary evaporator, and the solvent was removed. The obtained matter was dissolved in 200 ml of water, and this solution was stirred, and an aqueous solution of 0.12 mol of $NH_4PF_6$ dissolved in 100 ml of water was poured in, and a rough sediment of hexafluorophosphoric acid 1-ethyl-3-methyl imidazolium (Et—Im—Me·$PF_6$) was obtained. The obtained rough sediment was dissolved in warm methanol, and cooled to be recrystallized, and filtered and dried, and refined Et-Im-Me·$PF_6$ was obtained.

Mixing $LiPF_6$ and refined Et-Im-Me·$PF_6$ at a ratio of the number of Li atoms to number of imidazole rings (Im) of Li/Im=0.7, the mixture was heated, fused, mixed, cooled and solidified, and a solid ion conductor was obtained.

To $LiCoO_2$ powder, 10 wt. % of solid ion conductor was added, and heated, fused and kneaded, and the mixture was applied on Al foil to obtain a positive electrode.

On Li foil, the solid ion conductor was heated, fused and applied, and a negative electrode was obtained.

The negative electrode was heated until the solid ion conductor was fused, and this hot negative electrode was put on the positive electrode at room temperature and left over until the fused ion conductor was solidified, and then an electrochemical element was obtained. The positive and negative electrodes of the electrochemical element were arranged so that Al and Li might not contact with each other.

From the process of mixing $LiPF_6$ in refined Et-Im-Me·$PF_6$ to the process of obtaining the electrochemical element, the operation was conducted in a dry atmosphere. The obtained electrochemical element was a nonaqueous secondary battery, of which characteristic is as shown in FIG. 3.

EXAMPLE 6

This embodiment relates to an electrochemical element comprising a gel or solid ion conductor containing an ion including a structure shown in (II) or its derivative, and different cations at least as coexistent ions.

Dissolving 0.1 mol of triethyl phenyl ammonium bromide in 200 ml of water, while stirring this solution, an aqueous solution having 0.12 mol of $NH_4PF_6$ dissolved in 100 ml of water was poured in, and a rough sediment of hexafluorophosphoric acid triethyl phenyl ammonium was obtained. The obtained rough sediment was dissolved in warm methanol, and cooled, recrystallized, filtered, and dried, and refined hexafluorophosphoric acid triethyl phenyl ammonium was obtained.

Mixing $LiPF_6$ and hexafluorophosphoric acid triethyl phenyl ammonium at a ratio of number of Li atoms to number of quaternary ammonium nitrogen ($N^+$) of $Li/N^+$= 0.7, the mixture was heated, fused, mixed, cooled and solidified, and a solid ion conductor was obtained.

Using the obtained solid ion conductor instead of the solid ion conductor of Example 5, a positive electrode, a negative electrode, and an electrochemical element were obtained same as in Example 5. The characteristics of the obtained electrochemical element were same as in Example 5. Examples 7, 8, 11 relate to a gel or solid ion conductor comprising an ion containing the structure shown in (III) or its derivative, and different cations at least as coexistent ions.

EXAMPLE 7

Dissolving 0.2 mol of 1-methyl imidazole and 0.08 mol of 1,2-dibromoethane in 50 ml of acetonitrile, a cooler was attached to the container containing this solution so as to recover the evaporation component, and heating reaction was conducted on a water bath for 4 hours at 80° C. The obtained reaction solution was decompressed and heated in a rotary evaporator and the solvent was removed.

The obtained matter was dissolved in 150 ml of water, and while stirring this solution, an aqueous solution having 0.25 mol of $NH_4PH_6$ dissolved in 150 ml of water was poured in, and a rough sediment was obtained. The obtained rough sediment was dissolved in warm methanol, and cooled, recrystallized, filtered and dried, and a refined matter was obtained.

Mixing $LiPF_6$ and refined matter at a ratio of number of Li atoms to number of imidazole rings (Im) of Li/Im=0.7, the mixture was heated, fused, mixed, cooled, and solidified, and a solid ion conductor was obtained.

The obtained solid ion conductor was held between two Pt metal electrodes, and was heated and then cooled in air, and an element for measuring electric conductivity was obtained. By applying an alternating current of 120 Hz to the Pt electrode of this element, the electric conductivity of the solid ion conductor was measured, and it was $2\times10^{-3}$ S/cm. When direct current was applied, the electric conductivity was at measuring limit ($10^{-8}$ S/cm or less).

Further, the two Pt metal electrodes of the element for measuring electric conductivity were replaced by two Li metal electrodes, and the electric conductivity of the solid ion conductor was measured by direct current, and it was $4\times10^{-4}$ S/cm.

EXAMPLE 8

A solid ion conductor was obtained in the same manner as in Example 7 except that 1,6-dibromohexane was used instead of 1,2-dibromoethane in Example 7.

The obtained solid ion conductor was held between two Pt metal electrodes, and was heated and then cooled in air, and an element for measuring electric conductivity was obtained. By applying an alternating current of 120 Hz to the Pt electrode of this element, the electric conductivity of the solid ion conductor was measured, and it was $9\times10^{-4}$ S/cm. When direct current was applied, the electric conductivity was at measuring limit ($10^{-8}$ S/cm or less).

Further, the two Pt metal electrodes of the element for measuring electric conductivity were replaced by two Li metal electrodes, and the electric conductivity of the solid ion conductor was measured by direct current, and it was $1\times10^{-4}$ S/cm.

EXAMPLE 9

This embodiment relates to a gel or solid ion conductor comprising an ion including a structure shown in (IV) or its derivative, and different cations at least as coexistent ions.

A solid ion conductor was obtained in the same manner as in Example 7 except that triethylamine was used instead of 1-methyl imidazole and that 1,2-diiodethane was used instead of 1,2-dibromoethane in Example 7.

The obtained solid ion conductor was held between two Pt metal electrodes, and was heated and then cooled in air, and an element for measuring electric conductivity was obtained. By applying an alternating current of 120 Hz to the Pt electrode of this element, the electric conductivity of the solid ion conductor was measured, and it was $2\times10^{-4}$ S/cm. When direct current was applied, the electric conductivity was at measuring limit ($10^{-8}$ S/cm or less).

Further, the two Pt metal electrodes of the element for measuring electric conductivity were replaced by two Li metal electrodes, and the electric conductivity of the solid ion conductor was measured by direct current, and it was $8\times10^{-5}$ S/cm.

EXAMPLE 10

This embodiment relates to a gel or solid ion conductor comprising an ion including a structure shown in (V) or its derivative, and different cations at least as coexistent ions.

A solid ion conductor was obtained in the same manner as in Example 7 except that pyridine was used instead of 1-methyl imidazole in Example 7.

The obtained solid ion conductor was held between two Pt metal electrodes, and was heated and then cooled in air, and an element for measuring electric conductivity was obtained. By applying an alternating current of 120 Hz to the Pt electrode of this element, the electric conductivity of the solid ion conductor was measured, and it was $8\times10^{-4}$ S/cm. When direct current was applied, the electric conductivity was at measuring limit ($10^{-8}$ S/cm or less).

Further, the two Pt metal electrodes of the element for measuring electric conductivity were replaced by two Li metal electrodes, and the electric conductivity of the solid ion conductor was measured by direct current, and it was $1 \times 10^{-4}$ S/cm.

EXAMPLE 11

A solid ion conductor was obtained in the same manner as in Example 7 except that tetraethyl ammonium hexafluorophosphate was used instead of $LiPF_6$ in Example 7.

That is, Example 11 is same as Example 7 except that Li is replaced by tetraethyl ammonium.

The obtained solid ion conductor was held between two Pt metal electrodes, and was heated and then cooled in air, and an element for measuring electric conductivity was obtained. By applying an alternating current of 120 Hz to the Pt electrode of this element, the electric conductivity of the solid ion conductor was measured, and it was $8 \times 10^{-4}$ S/cm. When direct current was applied, the electric conductivity was at measuring limit ($10^{-8}$ S/cm or less).

EXAMPLE 12

Figure 4:
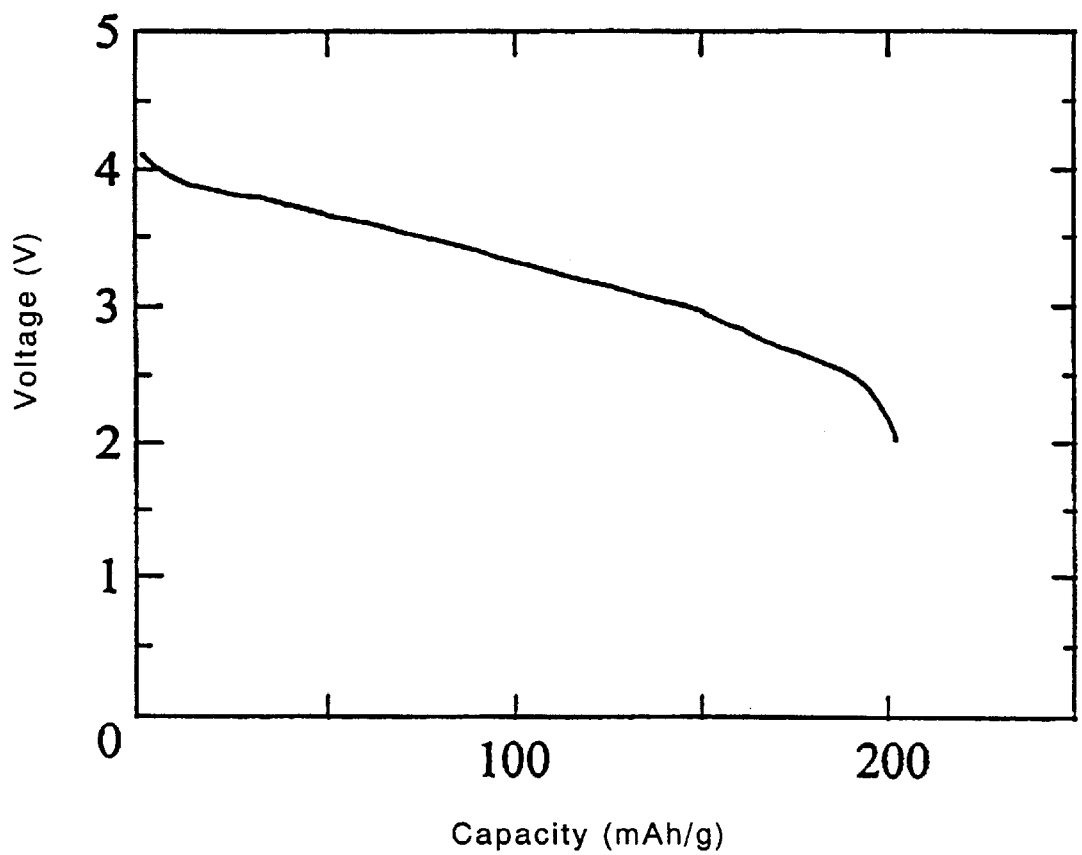
FIG. 4 is a diagram showing a charge-discharge curve of battery in embodiment 12.

A positive electrode, a negative electrode, and an electrochemical element were obtained in the same manner as in Example 5 except that the solid ion conductor in Example 7 was used instead of the solid ion conductor in Example 5. The characteristics of the obtained element are shown in FIG. 4.

EXAMPLE 13

This embodiment relates to a gel or solid ion conductor comprising an ion including a structure shown in (VI) or its derivative, and different cations at least as coexistent ions.

A solid ion conductor was obtained by mixing n-butyl viologen tetrafluorophosphate to the solid ion conductor in Example 10 by 75% by molar ratio. The electric conductivity of the obtained solid ion conductor was measured by using the Pt electrodes in the same manner as in Example 10, and it was $7 \times 10^{-4}$ S/cm by applying alternating current, and less than the measuring limit by applying direct current. In the direct current method using Li electrodes, it was $1 \times 10^{-4}$ S/cm.

EXAMPLE 14

A solid ion conductor was obtained by using $AgPF_6$ instead of $LiPF_6$ in Example 7. The electric conductivity of the obtained solid ion conductor was measured in the same manner as in Example 7, and, by using Pt electrodes, it was $9 \times 10^{-4}$ S/cm by applying alternating current, and less than the measuring limit by applying direct current. In the direct current method using Ag metal instead of Pt, the electric conductivity was $9 \times 10^{-5}$ S/cm.

EXAMPLE 15

A solid ion conductor was obtained by using $Zn(BF_4)_2$ instead of $LiPF_6$ in Example 7. The electric conductivity of the obtained solid ion conductor was measured in the same manner as in Example 7, and, by using Pt electrodes, it was $1 \times 10^{-4}$ S/cm by applying alternating current, and less than the measuring limit by applying direct current.

EXAMPLE 16

A solid ion conductor was obtained by using $Ca(BF_4)_2$ instead of $LiPF_6$ in Example 7. The electric conductivity of the obtained solid ion conductor was measured in the same manner as in Example 7, and, by using Pt electrodes, it was $2 \times 10^{-4}$ S/cm by applying alternating current, and less than the measuring limit by applying direct current.

EXAMPLE 17

A solid ion conductor was obtained same as in Example 5 by using $AgPF_6$ instead of $LiPF_6$ in Example 5. The electric conductivity of the obtained solid ion conductor was measured in the same manner as in Example 5, and, by using Pt electrodes, it was $7 \times 10^{-4}$ S/cm by applying alternating current, and less than the measuring limit by applying direct current. In the direct current method using Ag metal instead of Pt, the electric conductivity was $5 \times 10^{-5}$ S/cm. The obtained solid ion conductor was heated and fused, and impregnated in tantalum sinter for capacitor, and cooled gradually. Gold was evaporated in vacuum to the outside, and a silver paste was applied on the outer side, and lead wires were connected to prepare an electrochemical element. The electric conductivity of the obtained element was AC/DC=$5 \times 10^4$ as the ratio of alternating current and direct current at 1 kHz.

EXAMPLE 18

A solid ion conductor was obtained same as in Example 5 by using $Zn(BF_4)_2$ instead of $LiPF_6$ in Example 5. The electric conductivity of the obtained solid ion conductor was measured in the same manner as in Example 5, and, by using Pt electrodes, it was $6 \times 10^{-5}$ S/cm by applying alternating current, and less than the measuring limit by applying direct current. Using the obtained solid ion conductor, an electrochemical element was prepared in the same manner as in Example 17. The electric conductivity of the obtained element was AC/DC=$3 \times 10^4$ as the ratio of alternating current and direct current at 1 kHz.

EXAMPLE 19

A solid ion conductor was obtained same as in Example 5 by using $Ca(BF_4)_2$ instead of $LiPF_6$ in Example 5. The electric conductivity of the obtained solid ion conductor was measured in the same manner as in Example 5, and, by using Pt electrodes, it was $8 \times 10^{-5}$ S/cm by applying alternating current, and less than the measuring limit by applying direct current. Using the obtained solid ion conductor, an electrochemical element was prepared in the same manner as in Example 17. The electric conductivity of the obtained element was AC/DC=$5 \times 10^4$ as the ratio of alternating current and direct current at 1 kHz.

Embodiments of the invention are specifically described below while referring to FIG. 5 and FIG. 6. The following explanation is based on the result of experiment of the invention, but the invention is not limited to the illustrated embodiments alone, but may be modified appropriately within a scope not departing from the purpose thereof.

EXAMPLE 20

First, to be used as a positive active material, vanadium oxide ($Cu_{2.13}V_4O_{11}$) was synthesized as follows. Copper oxide (I), vanadium pentoxide, and metal copper were mixed at molar ratio of 1:2:0.13, and ground and mixed in a mortar. The mixture was put in a quartz tube and sealed in vacuum, and after reaction for 5 hours at 780° C., it was cooled to room temperature at a rate of 0.2° C. C/min.

Figure 5:
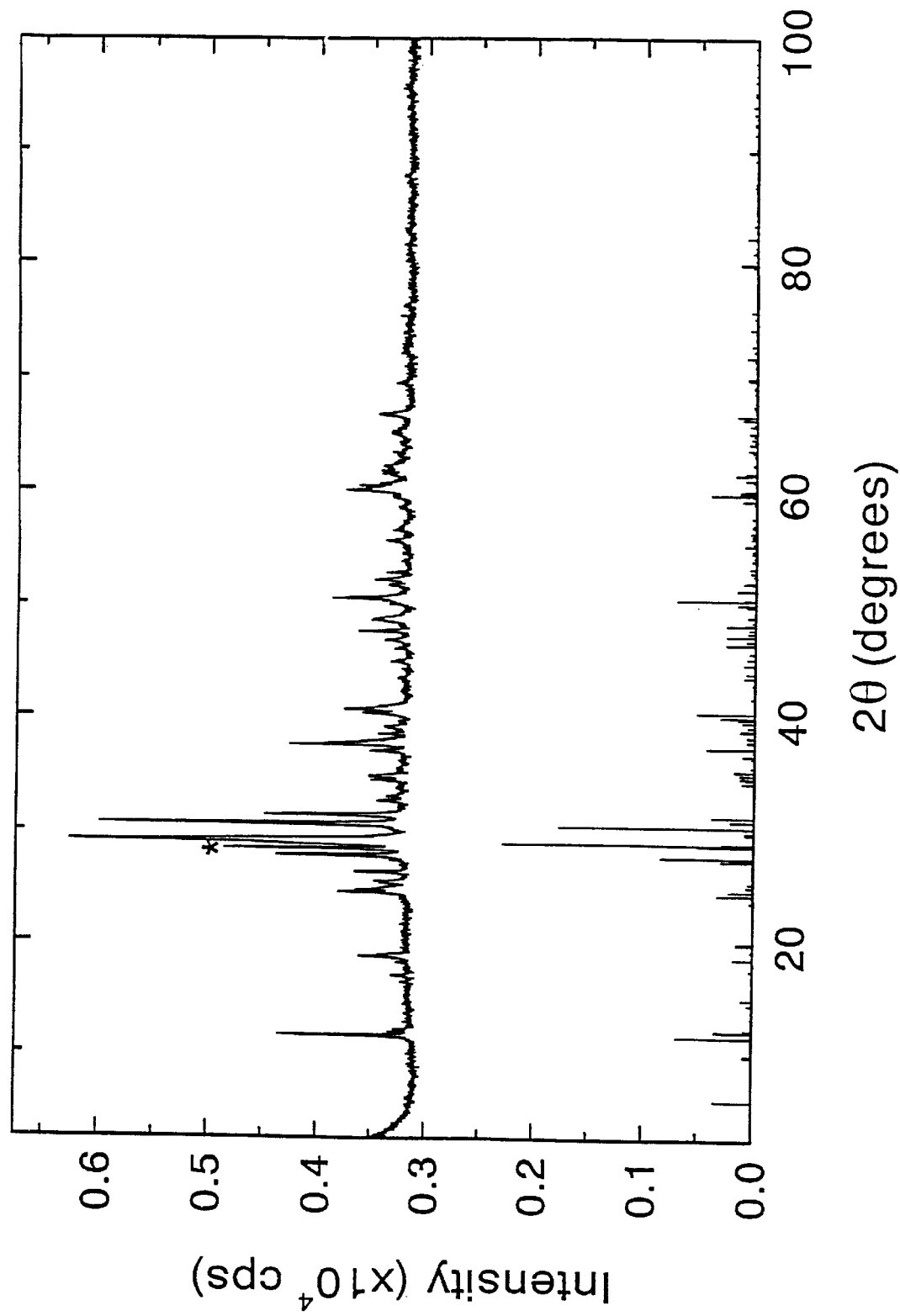
FIG. 5 is a powder X-ray diffraction pattern diagram of vanadium oxide prepared in embodiment 20.

FIG. 5 shows results of measurement of powder X-ray diffraction of $Cu_{2.13}V_4O_{11}$ obtained in this process. The simulation result of $Cu_{2.00}V_4O_{11}$ on the basis of the structural analysis result of $Cu_{1.8}V_4O_{11}$ reported by Galy et al. is shown in the bottom of FIG. 5.

Each peak of observed diffraction coincides with the simulation result except for the * mark, and the basic structure coincides with the structure reported by Galy et al. The diffraction peak of * mark is a mismatched reflection by Cu atom, and it is known to be arranged in a different periodic structure from $V_4O_{11}$ lattice.

To investigate the charge-discharge characteristics of this substance, a positive plate was prepared in the following method. By grinding $Cu_{2.13}V_4O_{11}$ obtained herein, 4 parts by weight of acetylene black and 9 parts by weight of PTFE were mixed in 87 parts by weight. The mixture was shaped into a pellet by a press, and a positive plate was obtained.

It was dried in vacuum for a half day at 200° C., and cooled to 100° C., and purged in argon gas, and transferred into a glove box sufficiently replaced with argon gas. It was impregnated with a solution of 1 mol/liter of $LiPF_6$ dissolved in a solvent mixing ethylene carbonate and diethyl carbonate at a ratio of 1:1 by volume, at reduced pressure of 50 cmHg.

Figure 7:
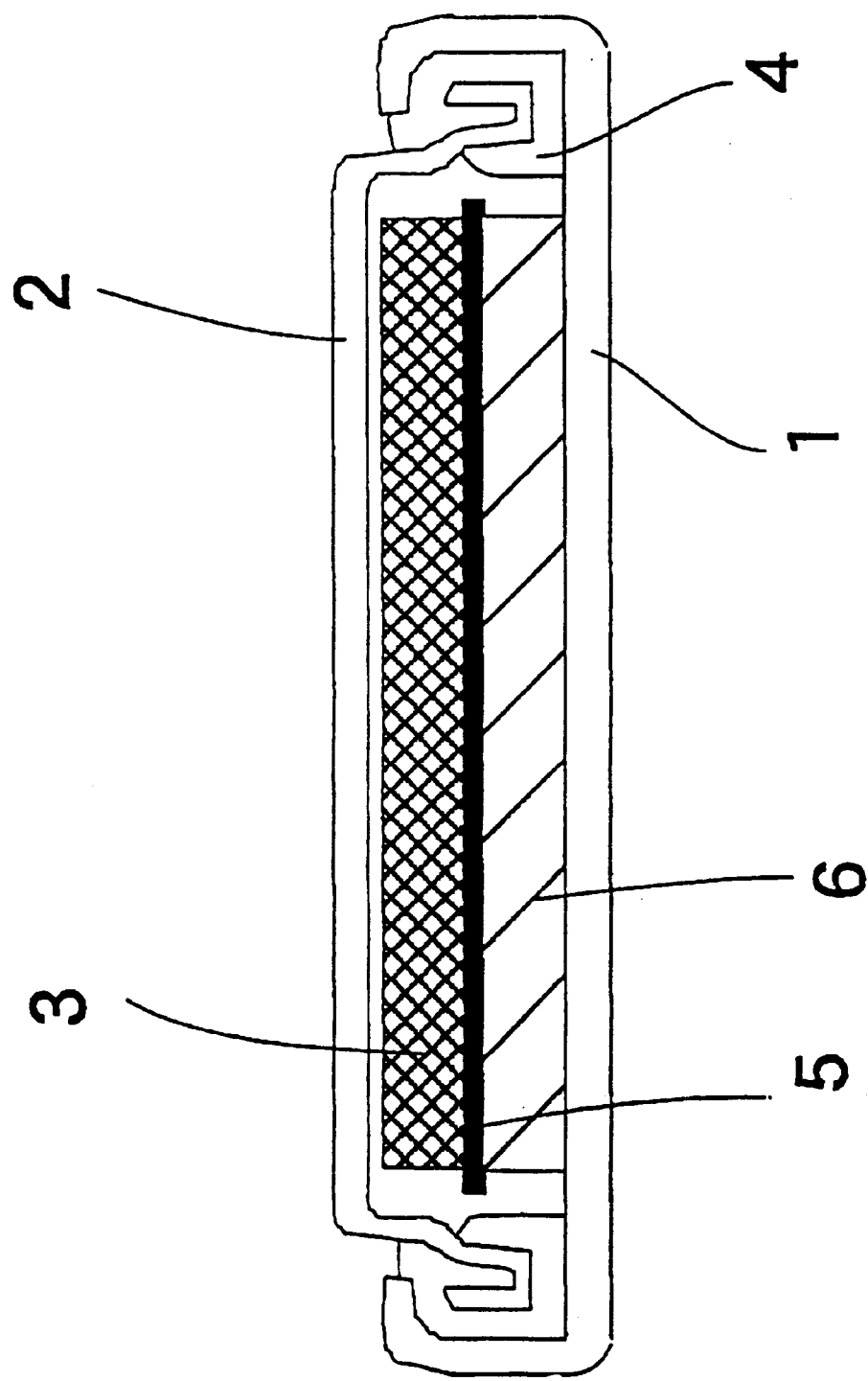
FIG. 7 is a longitudinal sectional view of the battery prepared in embodiment 20.

As a negative plate, a metal Li foil was used, and it was set opposite to the positive plate through a separator. FIG. 7 is a longitudinal sectional view of the battery. In the diagram, reference numeral 2 is a sealing plate, also used as negative electrode terminal, manufactured by processing a stainless steel plate, and a negative electrode 3 contacts with its inner wall. Reference numeral 5 is a polypropylene separator, and 6 is a positive electrode, and the opening end of the case 1 serving also as positive electrode terminal is crimped inward, and the inner circumference of the sealing plate 2 serving also as the negative electrode terminal is tightened through a gasket 4, thereby enclosing and sealing.

This battery was discharged until the terminal voltage of 2.0 V at a constant current of 0.2 mA, and then charged until the terminal voltage of 3.5 V at a constant current of 0.2 mA, and the charge-discharge characteristics were measured.

Figure 6:
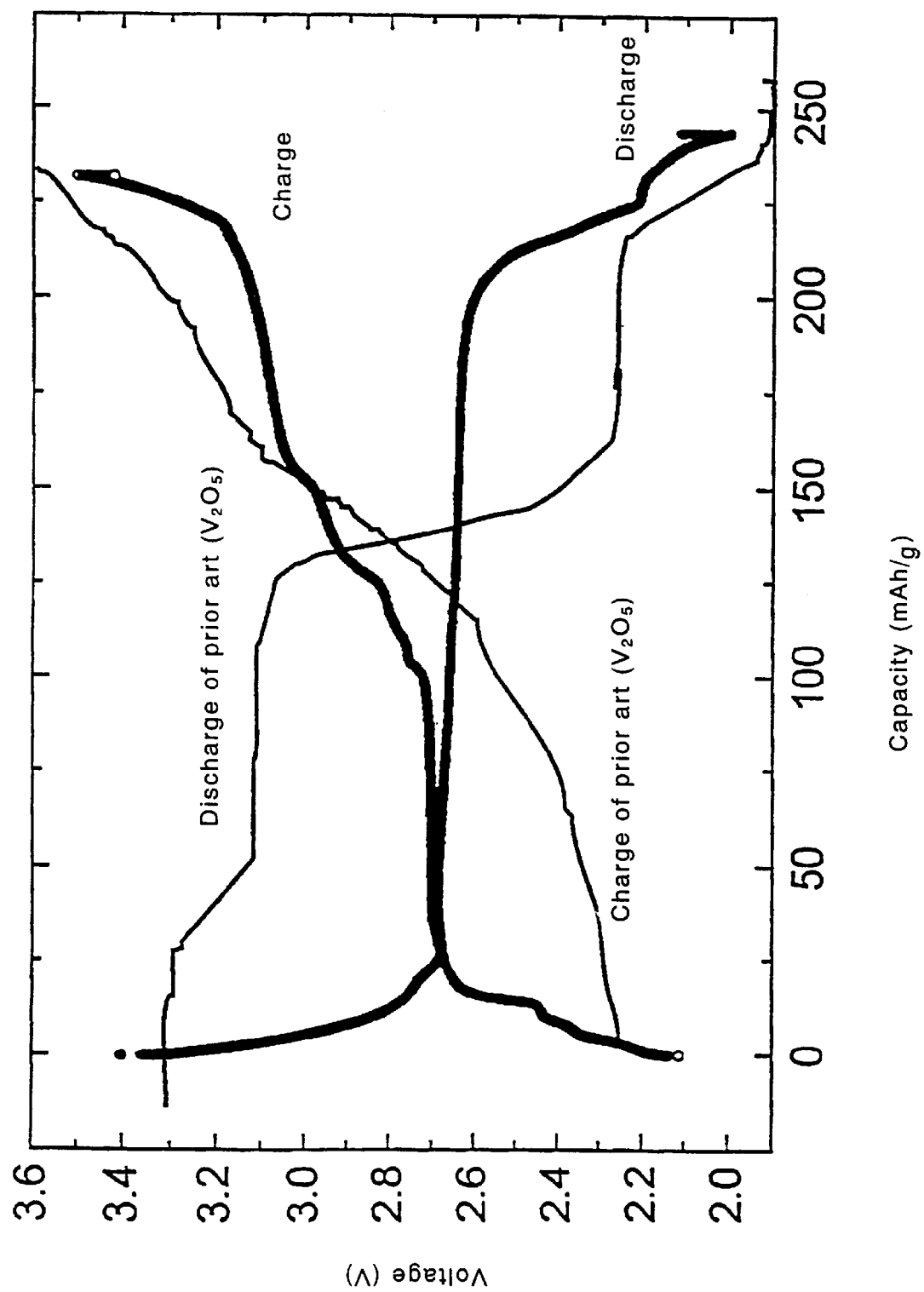
FIG. 6 is a charge-discharge characteristic diagram of battery prepared in embodiment 20.

Results of measurement of charge-discharge characteristics are shown in FIG. 6. The battery of the invention is wider in the voltage constant region in discharge as compared with the charge-discharge characteristics of the battery using the conventional vanadium oxide, and it is known to have better characteristics as the secondary battery as compared with the prior art. The repeating stability is also superior, and after 100 times of repeated charge and discharge, deterioration of discharge capacity was only 1%.

EXAMPLE 21

First, to be used as a positive active material, vanadium oxide ($Cu_1Li_{1.8}V_4O_{11}$) was synthesized as follows. Copper oxide (I), vanadium pentoxide, and metal copper were mixed at molar ratio of 1:2:0.8, and ground and mixed in a mortar. The mixture was put in a quartz tube and sealed in vacuum, and after reaction for 5 hours at 780° C., it was cooled to room temperature at a rate of 0.2° C./min. Thus obtained vanadium oxide was put in alcohol solvent to undergo ion exchange reaction with LiCl, and $Cu_1Li_{1.8}V_4O_{11}$ was obtained.

Using thus obtained positive active material, a battery was assembled same as in Example 20. As the negative electrode, however, instead of metal Li, pitch carbon was used to prepare negative plate. As a result, same charge-discharge characteristics as in Example 20 were obtained.

EXAMPLE 22

First, to be used as a positive active material, vanadium oxide ($Li_{1.8}V_4O_{11}$) was synthesized as follows. Copper oxide (I), vanadium pentoxide, and metal copper were mixed at molar ratio of 1:2:0.8, and ground and mixed in a mortar. The mixture was put in a quartz tube and sealed in vacuum, and after reaction for 5 hours at 780° C., it was cooled to room temperature at a rate of 0.2° C./min. Thus obtained vanadium oxide was put in alcohol solvent to undergo ion exchange reaction with LiCl, and $Li_{1.8}V_4O_{11}$ was obtained. By measurement of X-ray diffraction, same as in Example 20, mismatched reflection was observed, and it was confirmed that Li atoms were present in a different periodic structure from $V_4O_{11}$ lattice.

Using $Li_{1.8}V_4O_{11}$, the battery was assembled in the same manner as in Example 20, and this battery was discharged until the terminal voltage of 2.0 V at a constant current of 0.2 mA, and then charged until the terminal voltage of 3.5 V at a constant current of 0.2 mA, and the charge-discharge characteristics were measured. The discharge capacity was 220 mAh/g, and it is known to have better characteristics than the conventional vanadium Li ion secondary battery. The repeating stability is also superior, and after 100 times of repeated charge and discharge, deterioration of discharge capacity was only 1%.

EXAMPLE 23

First, to be used as a positive active material, vanadium oxide ($Cu_{2.00}V_{3.8}Mo_{0.2}O_{11}$) was synthesized as follows. Copper oxide (I), vanadium pentoxide, and molybdenum pentoxide were mixed at molar ratio of 1:1.9:0.1, and ground and mixed in a mortar. The mixture was put in a quartz tube and sealed in vacuum, and after reaction for 5 hours at 780° C., it was cooled to room temperature at a rate of 0.2° C./min. By measurement of X-ray diffraction pattern in the obtained $Cu_{2.00}V_{3.8}Mo_{0.2}O_{11}$, same as in Example 20, mismatched reflection was observed.

To investigate the charge-discharge characteristic of this matter, the battery was assembled in the same manner as in Example 20, and this battery was discharged until the terminal voltage of 2.0 V at a constant current of 0.2 mA, and then charged until the terminal voltage of 3.5 V at a constant current of 0.2 mA, and the charge-discharge characteristics were measured. The discharge capacity was 230 mAh/g, and it is known to have better characteristics than the conventional vanadium Li ion secondary battery. The repeating stability is also superior, and after 100 times of repeated charge and discharge, deterioration of discharge capacity was only 1%.

EXAMPLE 24

First, to be used as a positive active material, vanadium oxide ($Cu_{2.0}Li_{0.5}V_{3.8}Mo_{0.2}O_{11}$) was synthesized as follows. Copper oxide (I), vanadium pentoxide, molybdenum pentoxide, and metal lithium were mixed at molar ratio of 1:1.9:0.1:0.5, and ground and mixed in a mortar. The mixture was put in a quartz tube and sealed in vacuum, and after reaction for 5 hours at 780° C., it was cooled to room temperature at a rate of 0.2° C./min. By measurement of X-ray diffraction pattern in the obtained $Cu_{2.00}V_{3.8}Mo_{0.2}O_{11}$, same as in Example 20, mismatched reflection was observed.

To investigate the charge-discharge characteristic of this matter, the battery was assembled in the same manner as in Example 20, and this battery was discharged until the terminal voltage of 2.0 V at a constant current of 0.2 mA, and then charged until the terminal voltage of 3.5 V at a constant current of 0.2 mA, and the charge-discharge characteristics were measured. The discharge capacity was 250 mAh/g, and it is known to have better characteristics than the conventional vanadium Li ion secondary battery. The repeating stability is also superior, and after 100 times of repeated charge and discharge, deterioration of discharge capacity was only 1%.

In $A_xV_{4-z}M_zO_{11}$, meanwhile, from the relation with the valence of vanadium atoms, x is preferred to be 0 or more to 4 or less, and z is also preferred to be 0 or more to 4 or less. In $A_xB_yV_{4-z}M_zO_{11}$, too, from the relation with the valence of vanadium elements, x is preferred to be 0 or more to 4 or less, y is preferred to be 0 or more to 4 or less, and z is also preferred to be 0 or more to 4 or less. As element A and element B, aside from Cu and Li, it is realized by Ag, Cs or other metal elements.

EXAMPLE 25

Dissolving 0.5 g of copolymer of vinylidene fluoride and hexafluoropropylene in 4 g of N-methyl pyrrolidone, a polymer solution was obtained. Next, dissolving 0.05 mol of lithium tetrafluoroborate in 0.1 mol of 1-ethyl-3-methyl imidazolium tetrafluoroborate, the mixture was dissolved in the polymer solution, and a gel stock solution was obtained.

The process for obtaining the polymer solution and gel stock solution was conducted in argon. The gel stock solution was heated to 50° C., and applied on a glass plate, and it was preliminarily dried for 15 minutes at ordinary pressure and 65° C., and was dried in vacuum for 15 hours at 70° C., and a solid ion conductor was obtained. In a solvent mixing ethylene carbonate and diethyl carbonate at 1:1, lithium hexafluorophosphate was dissolved at a concentration of 1 mol/liter, and the obtained solid ion conductor was immersed for 10 minutes, and gel ion conductor was obtained. The obtained gel ion conductor was placed between two lithium metal electrodes, and the electric conductivity was measured in direct current, and it was $1 \times 10^{-4}$ S/cm.

Kneading 5 g of polyvinylidene fluoride dissolved in N-methyl pyrrolidone by 10% and 3 g of graphite powder, the mixture was applied on copper foil, and dried preliminarily for 15 minutes at ordinary pressure and 65° C., and dried in vacuum for 15 hours at 70° C., and a carbon electrode was obtained. In a solvent mixing ethylene carbonate and diethyl carbonate at 1:1, lithium hexafluorophosphate was dissolved at a concentration of 1 mol/liter, and the obtained carbon electrode was immersed for 10 hours, and a carbon electrode containing electrolyte solution was obtained.

Figure 8:
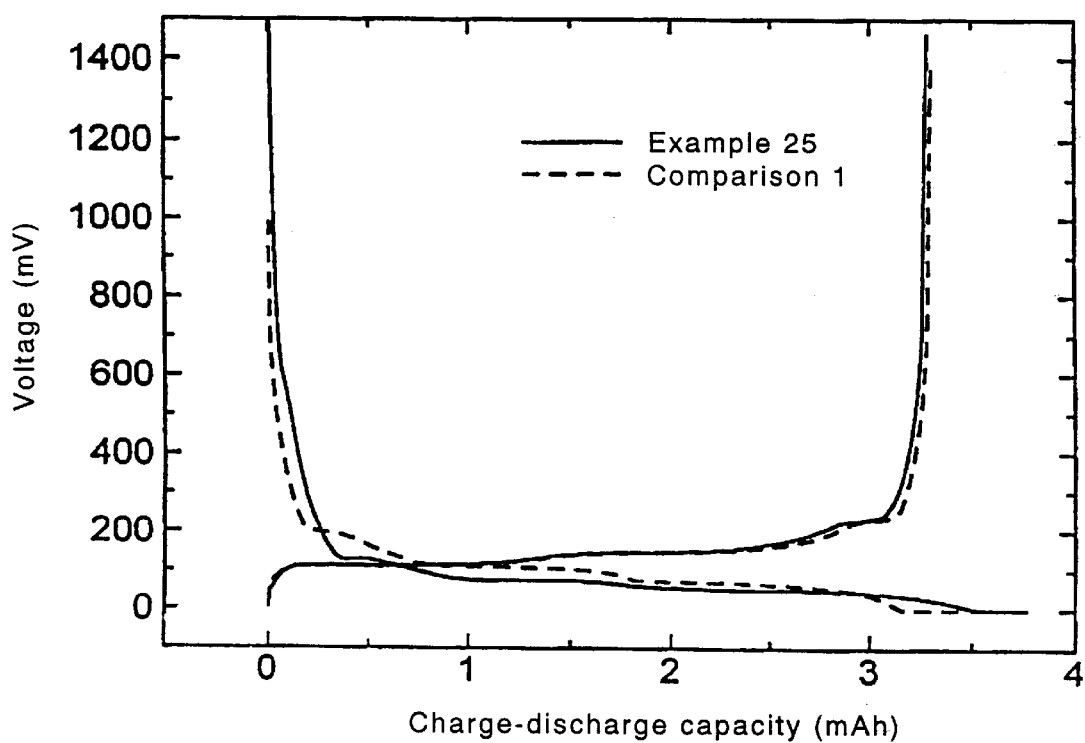
FIG. 8 is a charge-discharge characteristic diagram of battery.

A coin cell was prepared by placing a gel ion conductor of 16.5 mm in diameter between the metal lithium foil of 15 mm in diameter and carbon electrode containing electrolyte solution of 12.5 mm in diameter. The charge-discharge characteristics of the obtained cells are shown in FIG. 8 and Table 1. By repeating charge and discharge 10 times, the battery was decomposed, and the lithium electrode was observed, but growth of dendrite was not observed.

TABLE 1

|  | Charge capacity (mAh) | Discharge capacity (mAh) |
| --- | --- | --- |
| Example 25 | 3.77 | 3.28 |
| Example 26 | 3.64 | 3.22 |
| Example 27 | 3.57 | 3.18 |
| Comparison 1 | 3.46 | 3.31 |

Comparison 1

Instead of the gel ion conductor in Example 25, an electrolyte solution was impregnated in the separator, and a liquid type coin cell was prepared. The electrolyte solution was prepared by dissolving lithium tetrafluoroborate in a solvent mixing ethylene carbonate and diethyl carbonate at 1:1, at a concentration of 1 mol/liter, and the separator was porous polypropylene. The electrode was the same metal lithium foil used in Example 25 and the carbon electrode prepared in Example 25.

The charge-discharge characteristics of the obtained cells are shown in FIG. 8 and Table 1. Further repeating 10 times of charge and discharge, the battery was decomposed, and the lithium electrode was observed, and the area facing the carbon electrode was covered with dendrite. Growth of dendrite was not observed in the area not facing the carbon electrode.

EXAMPLE 26

A gel ion conductor was obtained in the same manner as in Example 25, except that poly(2-hydroxy ethyl methacrylate) was used instead of the copolymer of vinylidene fluoride and propylene hexafluoride in Example 25. The obtained gel ion conductor was placed between two lithium metal electrodes, and the electric conductivity was measured by direct current, and it was $0.7 \times 10^{-4}$ S/cm.

Further, a gel ion conductor was obtained by using polyacrylonitrile instead of the copolymer of vinylidene fluoride and propylene hexafluoride in Example 25. The obtained gel ion conductor was placed between two lithium metal electrodes, and the electric conductivity was measured by direct current, and it was $1.1 \times 10^{-4}$ S/cm.

Further, a gel ion conductor was obtained by using poly(3-hydroxy butyric acid) instead of the copolymer of vinylidene fluoride and propylene hexafluoride in Example 25. The obtained gel ion conductor was placed between two lithium metal electrodes, and the electric conductivity was measured by direct current, and it was $0.9 \times 10^{-4}$ S/cm.

Using these three gel ion conductors, coin cells were fabricated same as in Example 25, and the charge-discharge capacities of the obtained cells are shown in Table 1. When the battery was decomposed after repeating 10 times of charge and discharge, in any gel ion conductor, growth of dendrite was not observed on the metal lithium electrode.

EXAMPLE 27

Dissolving 0.5 g of copolymer of vinylidene fluoride and propylene hexafluoride in 4 g of N-methyl pyrrolidone, a polymer solution was obtained. Next, dissolving 0.1 mol of 1-ethyl-3-methyl imidazolium tetrafluoroborate and 0.05 mol of tetraethyl ammonium tetrafluoroborate in the polymer solution, and a gel stock solution was obtained.

The process for obtaining the polymer solution and gel stock solution was conducted in argon. The gel stock solution was heated to 50° C., and applied on a glass plate, and it was preliminarily dried for 15 minutes at ordinary pressure and 65° C., and was dried in vacuum for 15 hours at 70° C., and a solid ion conductor was obtained. In a solvent mixing ethylene carbonate and diethyl carbonate at 1:1, tetraethyl ammonium tetrafluoroborate was dissolved at a concentration of 1 mol/liter, and the obtained solid ion conductor was immersed for 10 minutes, and gel ion conductor was obtained.

The obtained gel ion conductor was placed between two platinum electrodes, and the electric conductivity was measured at 1 kHz, and it was $4 \times 10^{-3}$ S/cm. By direct current, the electric conductivity was below the measuring limit ($2 \times 10^{-9}$ S/cm).

Kneading 5 g of polyvinylidene fluoride dissolved in N-methyl pyrrolidone by 10% and 3 g of graphite powder, the mixture was applied on a copper foil, and dried preliminarily for 15 minutes at ordinary pressure and 65° C., and dried in vacuum for 15 hours at 70° C., and a carbon electrode was obtained. In a solvent mixing ethylene carbonate and diethyl carbonate at 1:1, tetraethyl ammonium tetrafluoroborate was dissolved at a concentration of 1 mol/liter, and the obtained carbon electrode was immersed for 10 hours, and a carbon electrode containing electrolyte solution was obtained.

Between two confronting carbon electrodes of 12.5 mm in diameter containing electrolyte solution, a gel ion conductor of 16.5 mm in diameter was placed to prepare an element. The case of this element was same as in the battery in Example 25. When a direct-current voltage of 1 V was applied to the obtained element, the current value was 0.1 $\mu$A or less. By applying an alternating-current voltage of 1 V at 0.12 kHz, the current value was 0.11 mA.

Comparing Example 25 and Comparison 1, the electrochemical element using gel ion conductor of Example 25 is known to suppress growth of dendrite on the metal lithium electrode, different from the case of using the electrolyte solution. Concerning the charge-discharge capacity, it is same whether gel ion conductor was used or electrolyte solution was used, and no particular deterioration was observed.

It is also known from Example 25 and Example 26 that the nonionic high polymer, which is a constituent element of ion conductor, is not particularly limited to the copolymer of vinylidene fluoride and propylene hexafluoride.

In Example 27, moreover, the ratio of current value is very large between the alternating current and direct current, and almost no current flows in direct current, and hence the electrochemical element in Example 27 is known to have a condenser-like property.

The salt dissolved in the ion conductor is not limited to the examples mentioned in the embodiments, but hexafluorophosphoric acid or tetrafluoroboric acid may be changed to various amide salts, imide salts, or other salts. Not limited to one salt, plural salts may be also used in mixture.

The solvent to be impregnated in the ion conductor is a mixed solvent of ethylene carbonate and diethyl carbonate, but it may be also changed to other solvent as far as decomposition reaction or other side reaction may not take place.

Also, the solvent for dissolving the nonionic high polymer may be also changed to other solvent as far as side reaction may not take place.

In the batteries in Examples 25 to 27, the carbon electrode is used as the electrode capable of absorbing and releasing lithium, but, instead of this, other compounds capable of absorbing and releasing lithium can be used such as lithium cobaltate, lithium nickelate, lithium manganate, and lithium vanadate. Other compounds capable of absorbing and releasing lithium may be also used. Moreover, for example, lithium cobaltate and graphite may be used in both electrodes, that is, compounds capable of absorbing and releasing lithium can be used in both positive electrode and negative electrode.

In the embodiments, the coin type cell is used as the case, but cases of other shapes may be also used, and the case material may be replaced by synthetic resin or the like. As the case, moreover, a vacuum pack by vacuum fusion of film or tube may be also used.

In the following Examples 28 to 31, lithium secondary batteries using a flexible graphite as the current collector of the invention are described. To exhibit the negative electrode characteristics more clearly, the negative electrode compositions intended to be used as negative electrode (negative active material, negative electrode current collector, and others) were used in the positive electrode, and metal lithium was used as the negative electrode. The reason is that lithium absorption and desorption in negative electrode composition are simplified by using metal lithium as the supply source of lithium ions, so that the characteristics of the secondary battery using the current collector of the invention may be proved.

EXAMPLE 28

In the carbon material used as the negative active material, novolak type phenol resin was used as the material, and it was heated at 180° C. in inert gas atmosphere, and the obtained cured resin was heated for 1 hour at 500° C. at heating rate of 5° C./min in inert gas atmosphere, and the obtained heated matter was ground to a mean particle size of 10 $\mu$m by a planetary ball mill.

The powder of the heated matter was heated for 1 hour at 1000° C. at heating rate of 5° C./min in inert gas atmosphere, and amorphous carbon was obtained. Mixing 3 g of this amorphous carbon powder in 3 g of a binder having polyvinylidene fluoride dissolved in N-methyl pyrrolidone by 10 wt. %, the mixture was applied and dried on a current collector of the invention composed of a flexible graphite sheet of 150 $\mu$m in thickness, 10 mg in weight and 1.0 g/cc in density, and an electrode plate was obtained.

As a result of X-ray diffraction measurement of this carbon powder, the d(002) plane was 0.375 nm. The specific surface area by BET method was 200 $m^2$ or less. The active material on the current collector was 10.4 mg.

An electrolyte solution was prepared by dissolving 1 mol/liter of $LiPF_6$ in an organic solvent mixing ethylene carbonate and diethyl carbonate at a ratio of 1:1. Using metal lithium as counter electrode of the carbon electrode, porous polypropylene impregnated with the electrolyte solution was placed between them, and it was put in a coin case of 2016 type, and by pressing and sealing, a coin cell for evaluation was fabricated.

Figure 9:
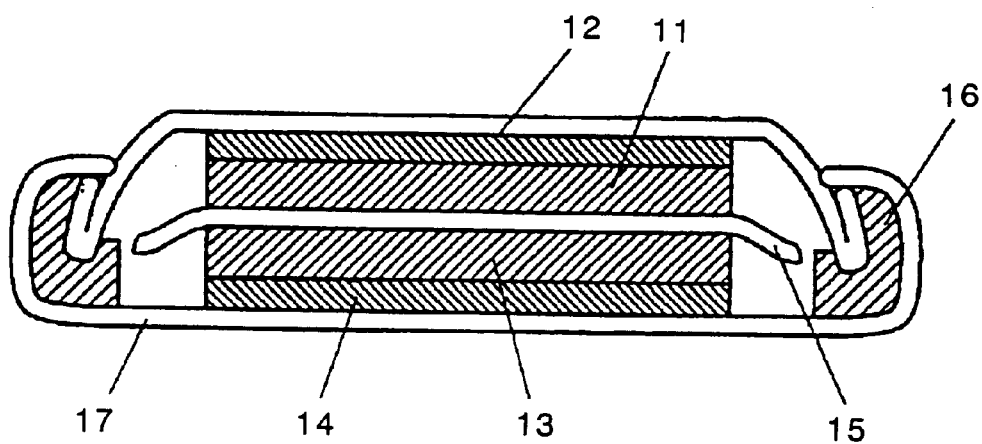
FIG. 9 is a battery sectional view in an example in which the invention is applied.

FIG. 9 shows a sectional view of a battery in an application example of the invention. Herein, a positive active material 11 is held on a positive electrode current collector 12, a negative active material 13 is held on a negative electrode current collector 14, and both electrodes are separated by a porous separator 15 impregnated with nonaqueous solvent electrolyte solution dissolving lithium salt, and a container case 17 is crimped through an insulating gasket 16, and a coin cell is manufactured.

Figure 10:
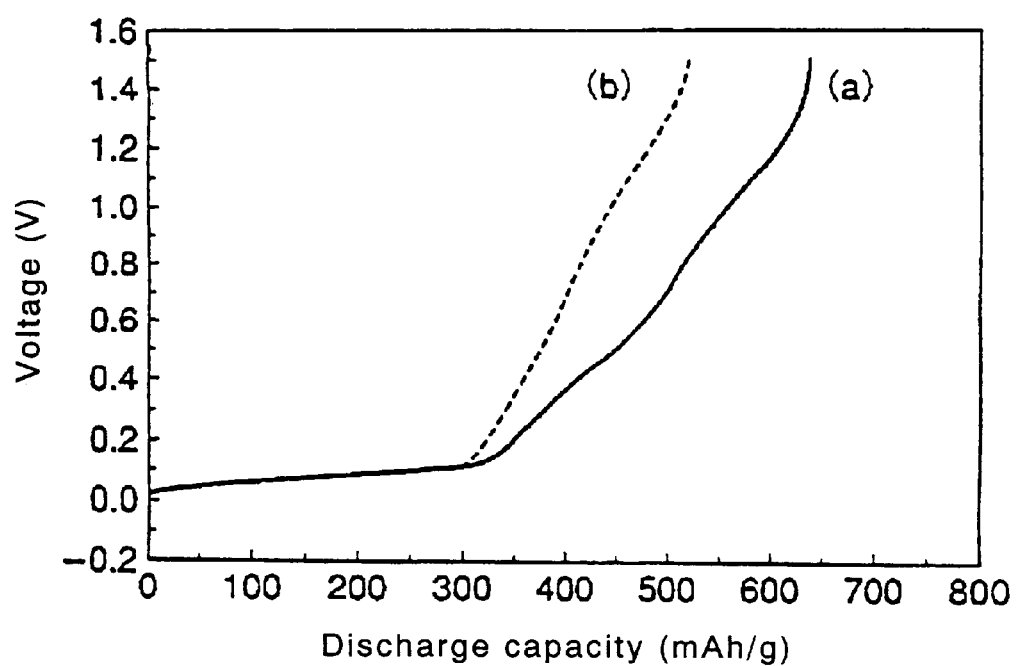
FIG. 10 is a discharge characteristic diagram.

Thus manufactured battery was charged until the potential of 0 V at a constant current of 0.2 mA, and the 0 V potential was held for 20 hours, and charging was terminated. The battery was then discharged until the potential of 1.5 V at a constant current of 0.2 mA. FIG. 10 shows a discharge curve. The solid line indicates the battery characteristic by using the graphite sheet of the invention as the current collector, and the broken line indicates the characteristic of conventional battery of Comparison 2 below (using copper foil as current collector). As a result, by using the current collector of the invention, a discharge capacity of 650 mAh/g was achieved, and the large capacity characteristic of the secondary battery not found in the prior art was presented.

The graphite sheet of the invention is obtained by baking a polyimide film of 75 $\mu$m in film thickness at 2900° C. in inert atmosphere, and the graphite sheet obtained by this manufacturing method is a graphite sheet of excellent flexibility that can be folded at a radius of curvature of 1 mm or less and angle of 160° or more.

By the graphite sheet showing such flexibility, the lithium secondary battery of light weight and large capacity of the invention is realized. The conventional sheet graphite does not have such folding and flexible properties, and it is different in material, manufacturing process, and properties of sheet.

Comparison 2

A coin cell was manufactured in the same manner as in Example 28 except that the current collector in Example 28 was replaced by a general copper foil. This copper foil was 20 μm in thickness and 16 mg in weight. This battery was charged until the potential of 0 V at a constant current of 0.2 mA, and the 0 V potential was held for 20 hours, and charging was terminated. The battery was then discharged until the potential of 1.5 V at a constant current of 0.2 mA. The result is indicated by broken line in FIG. 10. The discharge capacity was 500 mAh/g.

Thus, by using the current collector of the invention in the lithium ion secondary battery, the weight of the battery is reduced, and the energy density per unit weight is increased, and a lithium secondary battery of large capacity is realized.

EXAMPLE 29

The battery characteristics were evaluated in the same manner as in Example 28 except that 7.3 mg of graphite was used in the carbon material provided on the graphite sheet in Example 28. As a result, the discharge capacity was 700 mAh/g, and the capacity exceeded the theoretical capacity of graphite of 372 mAh/g. This is because the current collector of the invention used as the current collector also functions as an active material for absorbing and releasing lithium, aside from the current collecting function. Thus, the lithium ion secondary battery of the invention is reduced in the battery weight because the current collector is light in weight, and a lithium ion secondary battery of large capacity not known previously is realized.

As the cycle characteristic, the capacity is increased every time charging and discharging is repeated, and in dozens of cycles of charging and discharging, the battery characteristic does not deteriorate, and the lithium ion secondary battery of large capacity excellent in cycle characteristic is presented.

Figure 11:
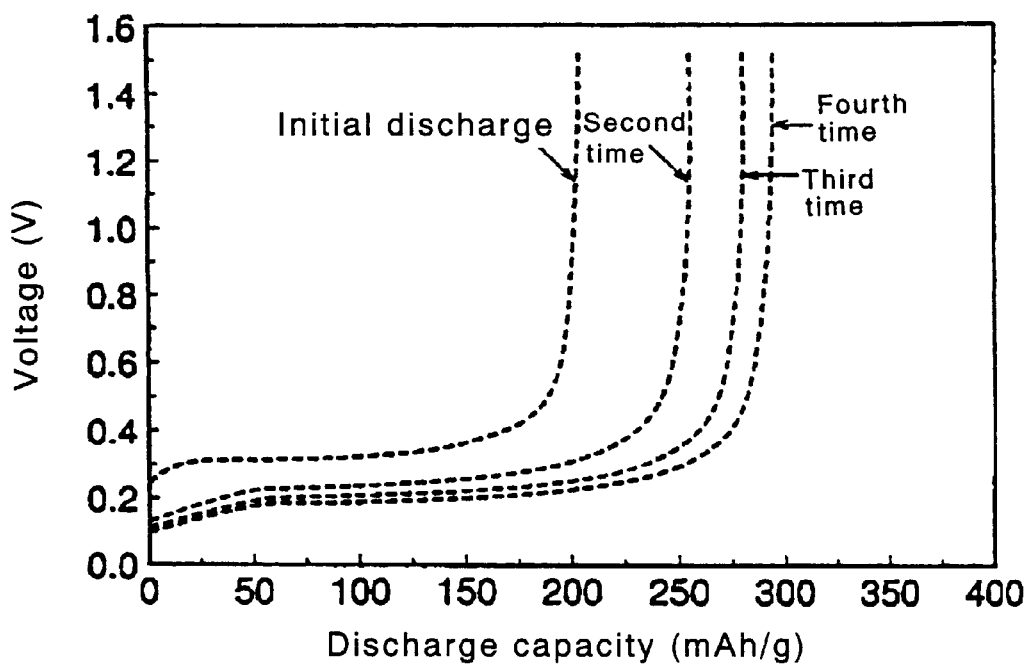
FIG. 11 is a discharge characteristic diagram of graphite sheet of the invention.

To explain the large capacity and excellent cycle characteristic, in the battery composition mentioned in Example 28, without forming the negative active material on the negative electrode current collector, the battery characteristic was evaluated same as in Example 28 by using the current collector of the invention alone, and, as shown in FIG. 11, the initial discharge capacity was 200 mAh/g, and the capacity increased second time and after. It means that the current collector of the invention has a function of absorbing and releasing lithium ions, aside from the current collecting function, and it is proved in this embodiment that the discharge capacity is increased in the cycle characteristic, too.

Therefore, by using the graphite sheet of the invention in the current collector, the energy density per unit weight is increased, and the lithium ion secondary battery excellent in cycle characteristic is realized.

EXAMPLE 30

The battery characteristics were evaluated in the same manner as in Example 28 except that the carbon material provided on the graphite sheet in Example 28 was replaced by 10.6 mg of mixture of amorphous carbon in Example 28 and graphite, and same effects as in Example 28 were obtained.

EXAMPLE 31

The battery characteristics were evaluated in the same manner as in Example 28 except that one side of the graphite sheet of the current collector of the invention in Example 28 was processed to be porous by using a needle of 0.3 mm in diameter. As a result, the discharge capacity was 700 mAh/g.

Thus, by porous treatment of the current collector of the invention, lithium ions are absorbed more smoothly, and the discharge capacity is increased. Thus, the lithium ion secondary battery of the invention is reduced in weight and a secondary battery of large capacity is presented.

On the porous graphite sheet, moreover, graphite and a mixture of graphite and amorphous carbon were provided, and battery characteristics were similarly evaluated, and the discharge capacity was increased.

Meanwhile, by using the current collector of the invention processed to be porous by laser, the discharge capacity was similarly increased.

In Examples 28 to 31, the graphite sheet current collector of the invention was applied in coin type lithium ion secondary batteries, but since the current collector of the invention is flexible, it may be spirally wound and may be applied in lithium ion secondary batteries of square, cylindrical or other shapes.

The invention thus brings about constituent elements for realizing nonaqueous secondary batteries having high energy density and high repeating stability, and nonaqueous secondary batteries using them.

It also realizes an electrochemical element comprising a gel or solid ion conductor using a nonionic high polymer, an ion including a structure shown in (I) or its derivative, and different cations at least as coexistent ions, so that high energy density is realized.

In the invention, since the conventional metallic current collector is not used, the battery weight can be reduced. Aside from the current collecting function, the current collector of the invention has a function of working as an active material by itself, and a larger capacity is realized.

Thus, in the secondary battery using the current collector of the invention, a novel secondary battery of light weight and high energy density is presented. It is particularly expected to be effective in the large-sized power source for electric vehicle and the like.

Moreover, the contact between the active material and the current collector of the invention is excellent, and the decrease of the battery capacity due to drop of contact between the current collector and active material due to charging and discharging cycles can be prevented, so that a battery excellent in cycle characteristics may be presented.

What is claimed is:

1. A method for preparing a carbon material, the method comprising:
   a) adding an aromatic compound to a resin, the aromatic compound containing 2 to 10 fused aromatic rings;
   b) curing the resin to form a cured resin;
   c) heating the cured resin at less than 700° C.;
   d) pulverizing the cured resin; and
   e) heating the cured resin and forming the carbon material.

2. A method for preparing a carbon material, the method comprising:
a) adding an aromatic compound to a phenol resin, in which the phenol is substituted with at least one methyl group, the aromatic compound selected from the group consisting of aromatic compounds with two fused rings and non-linear aromatic compounds with 3 to 10 fused rings;
b) curing the resin to form a cured resin;
c) heating the cured resin at less than 700° C.;
d) pulverizing the cured resin, and
e) heating the cured pulverized resin at a temperature of 800° C. to 1400° C. either in a vacuum or in an atmosphere containing 100 ppm or less of oxygen and 100 ppm or less of carbon dioxide and forming the carbon material.

3. The method of claim 2 in which step e) is carried out at a temperature of 900° C. to 1200° C.

4. The method of claim 3 in which the carbon material has a crystallite structure having pore sizes of <10 Å between adjacent crystallites.

* * * * *